US 8,072,505 B2

(12) United States Patent
Sugita et al.

(10) Patent No.: US 8,072,505 B2
(45) Date of Patent: Dec. 6, 2011

(54) IMAGING APPARATUS

(75) Inventors: Atsushi Sugita, Yokohama (JP); Hidehiro Katoh, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 322 days.

(21) Appl. No.: 12/460,198

(22) Filed: Jul. 15, 2009

(65) Prior Publication Data
US 2010/0020220 A1 Jan. 28, 2010

(30) Foreign Application Priority Data

Jul. 23, 2008 (JP) ................. 2008-189516
Jul. 23, 2008 (JP) ................. 2008-189517
Apr. 13, 2009 (JP) ................. 2009-097003
Apr. 13, 2009 (JP) ................. 2009-097004
Apr. 13, 2009 (JP) ................. 2009-097005

(51) Int. Cl.
H04N 5/228 (2006.01)
H04N 9/73 (2006.01)
H04N 5/222 (2006.01)

(52) U.S. Cl. ............. 348/222.1; 348/223.1; 348/333.01; 348/333.02

(58) Field of Classification Search ................ 348/222.1, 348/223.1, 333.01, 333.02
See application file for complete search history.

(56) References Cited

U.S. PATENT DOCUMENTS

2006/0066742 A1* 3/2006 Miyata ..................... 348/333.01
2007/0126877 A1* 6/2007 Yang ....................... 348/207.99
2007/0165115 A1* 7/2007 Sugimoto .................. 348/231.2

FOREIGN PATENT DOCUMENTS

JP 2003-274268 9/2003
JP 2005-165447 6/2005
JP 2006-145629 6/2006

* cited by examiner

Primary Examiner — Sinh Tran
Assistant Examiner — Christopher K Peterson
(74) Attorney, Agent, or Firm — Renner, Kenner, Greive, Bobak, Taylor & Weber

(57) ABSTRACT

Light from an object is converted by an imaging device into an electric signal carrying an object image. A video signal is generated by a video signal processor based on the electric signal. A human face is detected by a face detector if a human is contained in the image, based on the video signal. An on-screen signal is generated by an on-screen generator for either a first or a second menu window each for use in selection among imaging modes. The first and second windows are used when no face and the face is being detected, respectively. The on-screen signal is supplied to a screen which displays one of the windows. The generator is controlled by a controller based on information, supplied by the detector, indicating whether the face is contained in the image, so that the on-screen signal is generated for the first or the second window.

24 Claims, 14 Drawing Sheets

IMAGING APPARATUS

CROSS-REFERENCE TO RELATED APPLICATIONS

This application is based on and claims the benefit of priority from the prior Japanese Patent Application No. 2008-189516 filed on Jul. 23, 2008, No. 2008-189517 filed on Jul. 23, 2008, No. 2009-097003 filed on Apr. 13, 2009, No. 2009-097004 filed on Apr. 13, 2009, and No. 2009-097005 filed on Apr. 13, 2009, the entire contents of which is incorporated herein by reference.

BACKGROUND OF THE INVENTION

The present invention relates to an imaging apparatus equipped with multiple imaging modes, such as, imaging modes with preset aperture values and/or shutter speeds for particular scenes or imaging conditions and automatic imaging modes in which aperture values and/or shutter speeds are automatically set in accordance with surrounding brightness.

There are specific types of imaging apparatus, such as a video camera (camcorder) and a digital still camera, equipped with multiple imaging modes, thanks to advanced digital technology.

The imaging modes for such imaging apparatuses offer manual aperture-value and/or shutter-speed settings for particular scenes or imaging conditions, automatic aperture-value and/or shutter-speed settings in accordance with the surrounding brightness, etc.

Camera users can take higher quality images by selecting the best mode among those imaging modes.

Nevertheless, the imaging apparatuses with such multiple imaging modes require multiple procedures in selection of the best mode.

A technique to reduce the number of best-mode selection procedures is disclosed in Japanese Un-examined Patent Publication No. 2003-274268 (Document 1).

A new imaging mode introduced recently for imaging apparatuses is an automatic focusing mode in which a face is recognized when a target is a human, followed by automatic focusing onto the human face, disclosed in Japanese Un-examined Patent Publication No. 2006-145629 (Document 2). Such a human-face recognition technique would be provided for most imaging apparatuses.

In Document 1, the order of imaging modes in an imaging-mode menu window is switched based on the luminance and color of an image taken by an imaging apparatus and the time at the image is taken. Such mode-order switching allows a user to easily select an imaging mode, but requires specific procedures and signal processing circuitry for those conditions such as luminance and color of an image and an imaging time.

SUMMARY OF THE INVENTION

A purpose of the present invention is to provide an imaging apparatus that allows a user to easily select the best imaging mode in accordance with imaging conditions, without specific and complex signal processing circuitry.

The present invention provides an imaging apparatus comprising: an imaging device to convert light from a target object into an electric signal carrying an image of the object; a video signal processor to generate a video signal based on the electric signal; a human face detector to detect at least a human face of at least one human if the human is contained in the image, based on the video signal; an on-screen display generator to generate an on-screen signal for either a first imaging-mode menu window or a second imaging-mode menu window each for use in selection of an imaging mode among a plurality of imaging modes, the first imaging-mode menu window being used when no human face is being detected by the human face detector, the second imaging-mode menu window being used when the human face is being detected by the human face detector; a display screen to receive the on-screen signal to display the first or the second imaging-mode menu window; and a controller to control the on-screen display generator, based on face detection information supplied by the human face detector, the information indicating at least whether the human face is contained in the image, so that the on-screen display generator generates the on-screen signal for the first or the second imaging-mode menu window.

Moreover, the present invention provides an imaging apparatus comprising: an imaging device to convert light from a target object into an electric signal carrying an image of the object; a video signal processor to generate a video signal based on the electric signal; a human face detector to detect a human face of at lease one human if the human is contained in the image, based on the video signal; an imaging-condition setter to set an imaging condition suitable for each of a plurality of imaging modes to activate each imaging mode; an operation unit through which the imaging modes are switched from one to another; and a controller to control an order of the imaging modes so that the order of the imaging modes is changed between a first case where no human face is being detected by the human face detector and a second case where the human face is being detected by the human face detector, when the imaging modes are to be switched through the operation unit.

Furthermore, the present invention provides an imaging apparatus comprising: an imaging device to convert light from a target object into an electric signal carrying an image of the object; a video signal processor to generate a video signal based on the electric signal; a human face detector to detect a human face of at lease one human if the human is contained in the image, based on the video signal; an imaging-condition setter to set an imaging condition suitable for each of a plurality of imaging modes; and an controller to change the number of the imaging modes between a first case where no human face is being detected by the human face detector and a second case where the human face is being detected by the human face detector.

DETAILED DESCRIPTION OF PREFERRED EMBODIMENTS

Preferred embodiments according to the present invention will be disclosed with reference to the drawings attached herewith.

First Embodiment

Figure 1:
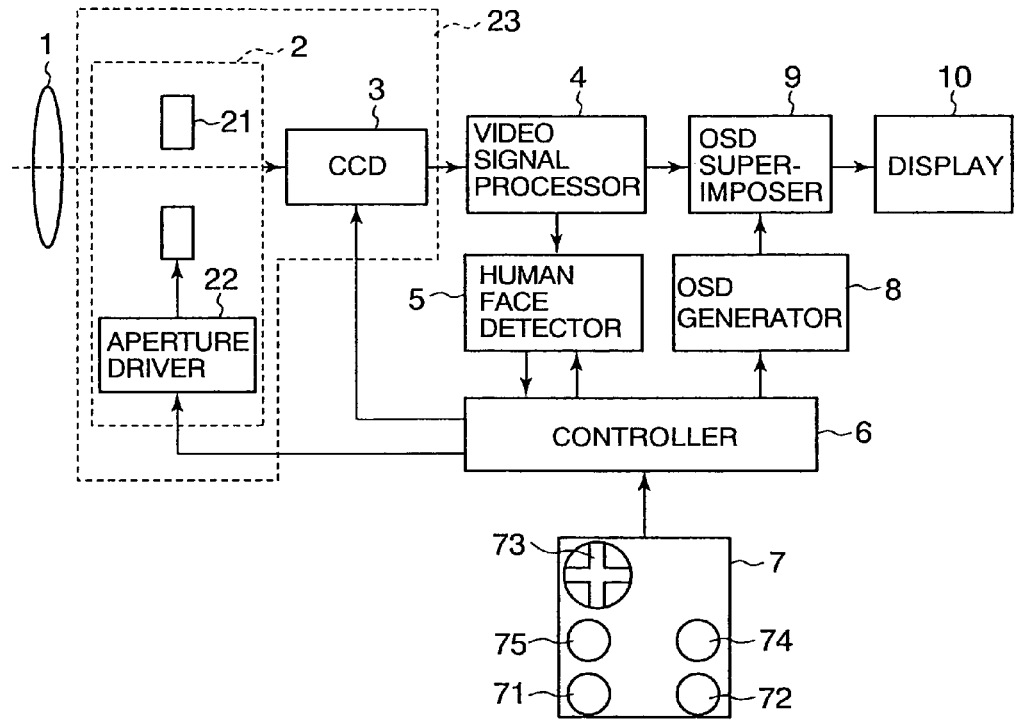
FIG. 1 shows a block diagram of an imaging apparatus according to the present invention.

Described first with reference to a block diagram of FIG. 1 is an overall configuration of the first embodiment of imaging apparatus. The block diagram of FIG. 1 is also applied to other embodiments which will be described later.

In FIG. 1, light from a target object is captured by a lens 1. The light is then incident on an imaging device 3, such as CCD, while its quantity is being adjusted by an aperture unit 2 that has an aperture 21 and an aperture driver 22.

The light incident on the imaging device 3 is converted into electric pixel signals and then supplied to a video signal processor 4.

On receiving the pixel signals, the video signal processor 4 generates video signals, such as, RGB signals, with specific signal processing. The video signals that have been applied the specific signal processing are then supplied to a human face detector 5 and an OSD (On Screen Display) superimposer 9.

On receiving the video signals, the human face detector 5 detects one or more human faces contained in an image, the number of the faces and their positions by detecting skin color portion of the image or by using known pattern recognition technique. The, the detector 5 supplies face detection information including the number of the faces and their positions to a controller 6.

The controller 6, for example, a microprocessor, controls an OSD generator 8 in accordance with the face detection information and/or operation on an operation unit 7.

The OSD generator 8 generates an OSD signal under control by the controller 6 and supplies the OSD signal to the OSD superimposer 9.

The OSD superimposer 9 superimposes the OSD signal on the video signals supplied from the video signal processor 4. The video signals superimposed with the OSD signal are then displayed on a display screen 10.

The controller 9 outputs a control signal to the aperture driver 22, such as a motor, in accordance with an aperture value, to achieve an imaging condition suitable for a selected imaging mode, in accordance with operation on the operation unit 7. Then, the aperture driver 22 adjusts the size of the aperture 21 in accordance with the control signal.

Moreover, the controller 9 outputs a control signal to the imaging device 3 to adjust a time duration during which the imaging device 3 converts the incident light to pixel signals when a user presses a shutter button 74 on the operation unit 7, to achieve an appropriate condition for respective imaging modes. The first embodiment employs this electric means to adjust the time duration for the imaging device 3 to achieve a shutter operation.

Then, the imaging device 3 converts the incident light to pixel signals for a time duration in accordance with the control signal from the controller 6 and outputs the pixel signals to the video signal processor 4.

As described above, the aperture unit 2 and the imaging device 3 constitute an imaging-condition setter 23 to set an imaging condition (the aperture value and shutter speed) suitable for a desired imaging mode so that the imaging mode becomes active.

In addition to the shutter button 74, the operation unit 7 is equipped with a menu displaying button 71, a backlight-compensating/spot-metering button 72, a cursor button 73, and an enter button 75.

Figure 2:
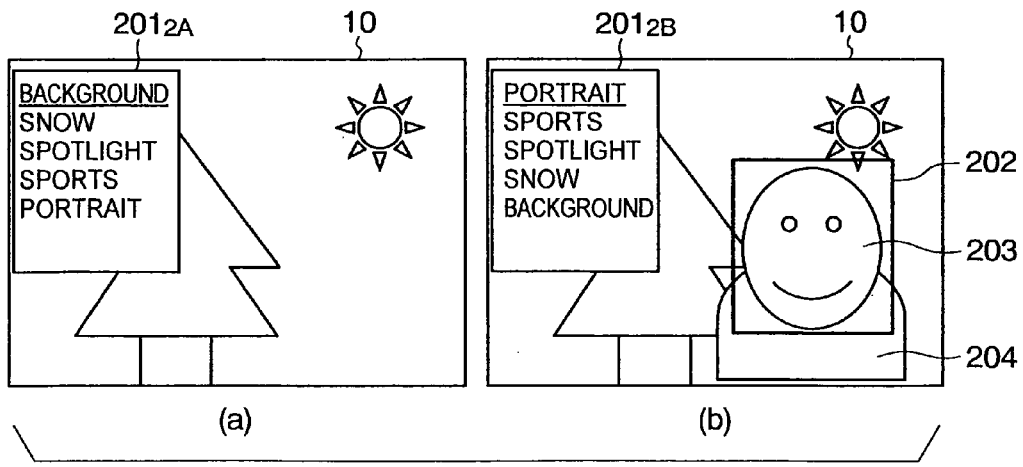
FIG. 2 shows views of exemplary images to be displayed with imaging-mode menu windows according to a first embodiment of the present invention.

Described next with respect to FIG. 2 is the operation of the first embodiment, focusing on the human face detector 5.

Illustrated in (a) and (b) of FIG. 2 are exemplary images to be displayed on the display screen 10 in the cases where the human face detector 5 is detecting no human faces and detecting one human face, respectively.

When a user presses the menu displaying button 71 of the operation unit 7 while the human face detector 5 is not detecting any human faces, the OSD generator 8 generates an OSD signal for an imaging-mode menu window $201_{2A}$ under control by the controller 6. The OSD signal is then supplied to the display screen 10 so that the menu window $201_{2A}$ is displayed at, for example, the left side of the screen 10, as shown in (a) of FIG. 2.

Imaging modes listed in the imaging-mode menu window $201_{2A}$ in (a) of FIG. 2 are: BACKGROUND for exposure suitable for a background, while shutting a relatively large amount of light that passes the aperture 21; SNOW for a specific environment, such as, a snowy field in a fine day, so that the surrounding becomes not bright too much when an image is taken; SPOTLIGHT for a human under a spotlight so that the human becomes not bright too much when an image is taken; SPORTS for taking an image with frame by frame of an object that is moving fast; and PORTRAIT for a clear image of a human with a blurred background.

The imaging modes BACKGROUND and SNOW are suitable for taking images of scenery, in which no humans exist or humans are not focused. In contrast, the imaging modes SPOTLIGHT, SPORTS and PORTRAIT are suitable for taking images in which humans are focused.

A cursor is located on the top imaging mode, BACKGROUND in (a) of FIG. 2, in the imaging-mode menu window $201_{2A}$ when the window $201_{2A}$ is displayed. There is no active imaging mode when the window $201_{2A}$ is displayed. A user presses the cursor button 73 to select an imaging mode and then presses the enter button 74 to activate the selected mode.

When an imaging mode is activated, the controller 6 supplies control signals in accordance with the active mode for an aperture value and a time duration during which the imaging device 3 converts the incident light to pixel signals, to the aperture driver 22 and the imaging device 3, respectively.

The imaging modes listed in the imaging-mode menu window $201_{2A}$ in (a) of FIG. 2 are BACKGROUND, SNOW, SPOTLIGHT, SPORTS, and PORTRAIT from the top. Since the cursor is located on the top imaging mode of BACKGROUND when the window $201_{2A}$ is displayed, a user can easily select the desired imaging mode.

Described so far with reference to (a) of FIG. 2 is the case where the human face detector 5 does not detect any human faces.

In contrast, when the human face detector 5 detects a human face, the detector 5 supplies face detection information including the number of the face and its position to the controller 6.

On receiving the face detection information, the controller 6 outputs a control signal to the OSD generator 8 so that the generator 8 generates an OSD signal for a face-detection zone window 202 having a frame that covers a face 203 of a human 204, as shown in (b) of FIG. 2.

The OSD signal is then supplied to the OSD superimposer 9. The OSD superimposer 9 superimposes the OSD signal on the video signals supplied from the video signal processor 4. The video signals superimposed with the OSD signal are then supplied to the display screen 10, thus an image is displayed on the screen 10, with the face-detection zone window 202 having the frame that covers the face 203 of the human 204, as shown in (b) of FIG. 2.

Also displayed with the face-detection zone window 202 in (b) of FIG. 2 is an imaging-mode menu window $201_{2B}$ for the case where the human face detector 5 detects a human face.

The imaging modes listed from the top of the imaging-mode menu window $201_{2B}$ are PORTRAIT, SPORTS, SPOTLIGHT, SNOW, and BACKGROUND. Since the cursor is located on the top imaging mode of PORTRAIT when the window $201_{2B}$ is displayed, a user can easily select the desired imaging mode.

Figure 3:
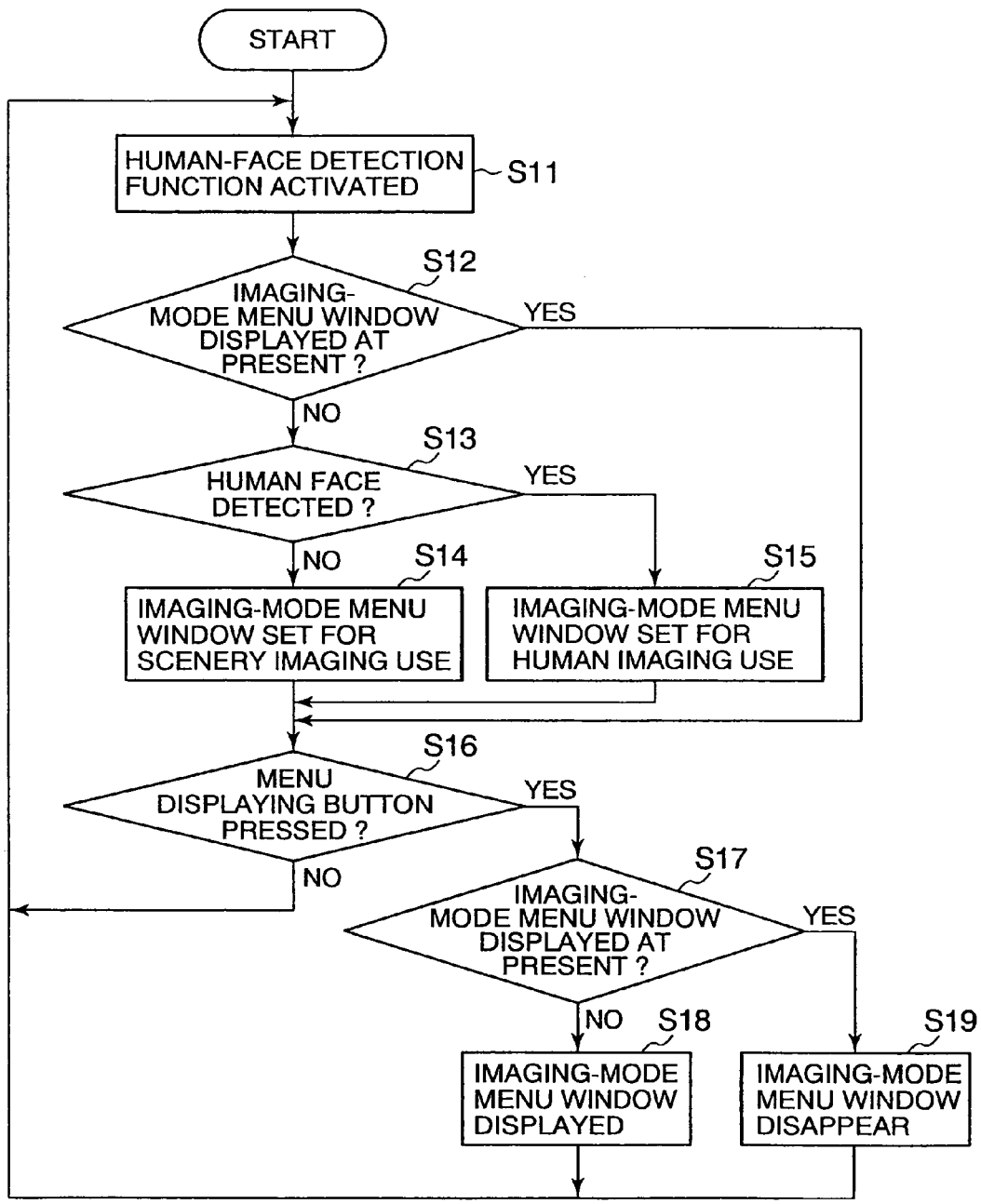
FIG. 3 shows a flow chart for an imaging-mode menu window setting operation according to the first embodiment of the present invention.

Described next with reference to a flow chart shown in FIG. 3 is an imaging-mode menu window setting operation in the first embodiment.

When power is on for the imaging apparatus shown in FIG. 1, the controller 6 activates a human-face detection function of the human face detector 5 in Step S11.

Then, the controller 6 determines in Step S12 whether an imaging-mode menu window is being displayed on the display screen 10 at present.

A user could be perplexed when the order of imaging modes changes while an imaging-mode menu window is being displayed. Thus, the process moves to Step S16 when it is determined that an imaging-mode menu window is being displayed (YES in Step S12) whereas to Step S13 when it is determined that no imaging-mode menu window is being displayed (NO in Step S12).

In Step S13, the controller 6 determines whether a human face is being detected based on the face detection information from the human face detector 5.

When it is determined that no human faces are being detected (NO in Step S13), the controller 6 sets the menu window at the imaging-mode menu window $201_{2A}$ for scenery imaging use, in Step S14. On the contrary, when it is determined that a human face is being detected (YES in Step S13), the controller 6 sets the menu window at the imaging-mode menu window $201_{2B}$ for human imaging use, in Step S15.

In the following description, the term "scenery imaging" will be used for imaging scenery in which no human faces are detected by the human face detector 5.

The controller 6 further determines in Step S16 whether the menu displaying button 71 is pressed by a user. When it is determined that the button 71 is not pressed (NO in Step S16), the process returns to Step S11. On the contrary, when it is determined that the button 71 is pressed (YES in Step S16), the process moves to Step S17.

In Step S17, the controller 6 further determines whether an imaging-mode menu window is being displayed on the display screen 10 at present.

When it is determined that no imaging-mode menu window is being displayed (NO in Step S17), the process moves to Step S18 for menu displaying. In detail, the controller 6 supplies a control signal to the OSD generator 8 so that the generator 8 generates an OSD signal for the imaging-mode menu window $201_{2A}$ set in Step S14 or the imaging-mode menu window $201_{2B}$ set in Step S15. The OSD signal is supplied to the OSD superimposer 9 which then superimposes the OSD signal on the video signals supplied from the video signal processor 4. The video signals superimposed with the OSD signal are then supplied to the display screen 10, thus the window $201_{2A}$ or window $201_{2B}$ being displayed on the screen 10.

On the contrary, when it is determined that an imaging-mode menu window is being displayed (YES in Step S17), the controller supplies a control signal to the OSD generator 8 so that the generator 8 stops generation of an OSD signal, in Step S19, thus the imaging-mode menu window now on display disappears (or the menu window is off when the menu displaying button 71 is pressed twice.)

Figure 4:
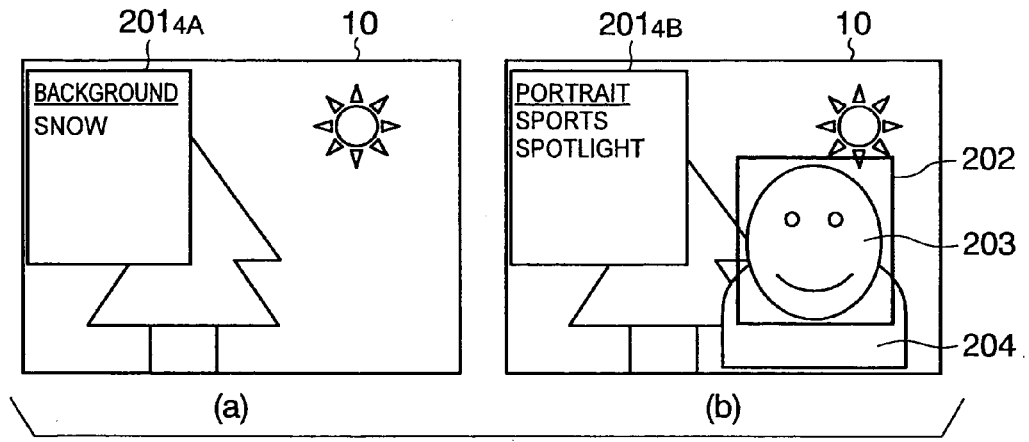
FIG. 4 shows views of further exemplary images to be displayed with imaging-mode menu windows according to the first embodiment of the present invention.
Figure 5:
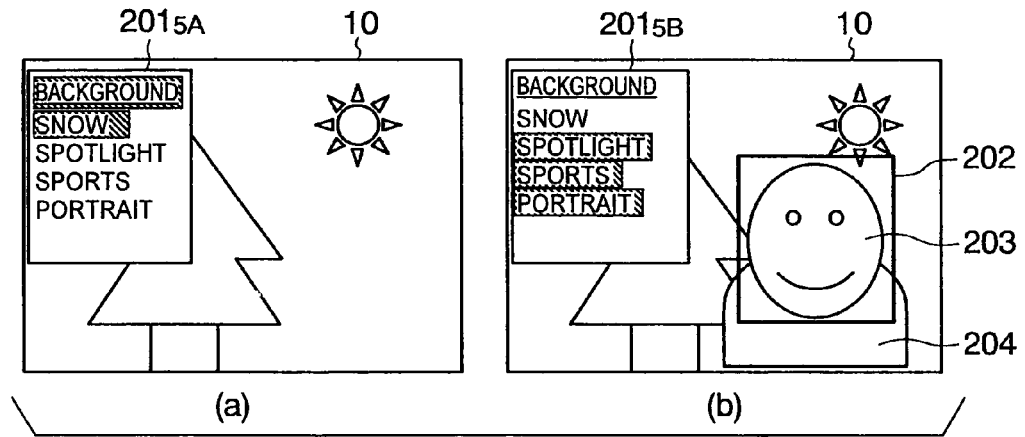
FIG. 5 shows views of further exemplary images to be displayed with imaging-mode menu windows according to the first embodiment of the present invention.
Figure 6:
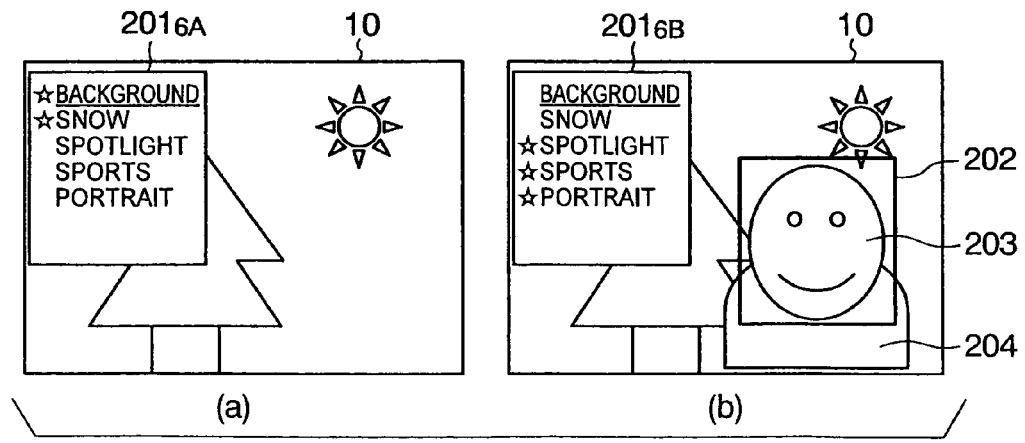
FIG. 6 shows views of further exemplary images to be displayed with imaging-mode menu windows according to the first embodiment of the present invention.

Described next with reference to FIGS. 4 to 6 are further exemplary imaging-mode menu windows, in the first embodiment.

Shown in (a) of FIG. 4 is an imaging-mode menu window $201_{4A}$ with only two modes of BACKGROUND and SNOW that may be frequently used in scenery imaging. The modes of PORTRAIT, SPORTS and SPOTLIGHT may be displayed with grey or another pale color in (a) of FIG. 4 so that BACKGROUND and SNOW become noticeable.

Shown in (b) of FIG. 4 is an imaging-mode menu window $201_{4B}$ with only three modes of PORTRAIT, SPORTS and SPOTLIGHT that may be frequently used in human imaging. The modes of BACKGROUND and SNOW may be displayed with grey or another pale color in (b) of FIG. 4 so that PORTRAIT, SPORTS and SPOTLIGHT become noticeable.

In the menu windows in (a) and (b) of FIG. 4, the number of imaging modes may be decreased and the order of the modes may be changed.

Shown in (a) of FIG. 5 is an imaging-mode menu window $201_{5A}$ with highlighted modes of BACKGROUND and SNOW that may be frequently used in scenery imaging. Shown in (b) of FIG. 5 is an imaging-mode menu window $201_{5B}$ with highlighted modes of PORTRAIT, SPORTS and SPOTLIGHT that may be frequently used in human imaging.

In the menu windows in (a) and (b) of FIG. 5, those frequently used imaging modes may be displayed with a specific type of font, color or boldface, instead of being highlighted, in order to be seen clearer than the other modes.

Shown in (a) of FIG. 6 is an imaging-mode menu window $201_{6A}$ with the modes of BACKGROUND and SNOW that may be frequently used in scenery imaging, indicated by a star mark. Shown in (b) of FIG. 6 is an imaging-mode menu window $201_{6B}$ with the modes of PORTRAIT, SPORTS and SPOTLIGHT that may be frequently used in human imaging, indicated by a star mark.

In the menu windows in (a) and (b) of FIG. 6, the star mark can be replaced with any mark.

Figure 7:
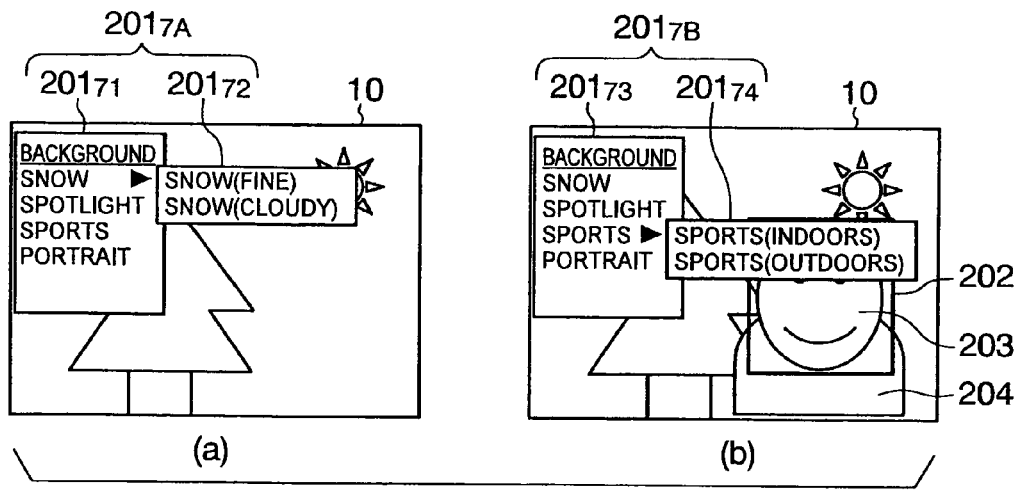
FIG. 7 shows views of further exemplary images to be displayed with imaging-mode menu windows according to the first embodiment of the present invention.

Shown in (a) and (b) of FIG. 7 are still further exemplary imaging-mode menu windows.

Modes of SNOW (FINE) and SNOW (CLOUDY) shown in (a) of FIG. 7 are sub-functions of SNOW, providing finer exposure adjustments to SNOW. Modes of SPORTS (INDOORS) and SPORTS (OUTDOORS) shown in (b) of FIG. 7 are sub-functions of SPORTS, providing finer exposure adjustments to SPORTS.

In detail, shown in (a) of FIG. 7 is an imaging-mode menu window $201_{7A}$, a combination of a main-mode widow $201_{71}$ and a sub-mode widow $201_{72}$ of SNOW (FINE) and SNOW (CLOUDY) that may be frequently used in scenery imaging.

Shown in (b) of FIG. 7 is an imaging-mode menu window $201_{7B}$, a combination of a main-mode widow $201_{73}$ and a sub-mode widow $201_{74}$ of SPORTS (INDOORS) and SPORTS (OUTDOORS) that may be frequently used in human imaging.

The sub-mode widow $201_{72}$ shown in (a) of FIG. 7 is not included in and not appeared the imaging-mode menu window $201_{7B}$ shown in (b) of FIG. 7. Conversely, the sub-mode widow $201_{24}$ shown in (b) of FIG. 7 is not included in and not appeared the imaging-mode menu window $201_{7A}$ shown in (a) of FIG. 7.

The imaging-mode menu windows $201_{7A}$ and $201_{7B}$ shown in (a) and (b), respectively, of FIG. 7 allow a user to easily select a sub-function mode of a desired imaging mode.

Second Embodiment

Described next is the second embodiment of imaging apparatus according to the present invention. The differences between the first and second embodiments lie in the human face detector 5 and the imaging-mode menu window.

In the following description, the same reference numerals as shown in FIG. 1 of the first embodiment will be used in the second embodiment and also the other embodiments which will be described later. Because the entire circuit block diagram of FIG. 1 is applied to all of the embodiments of the present invention, although one or more components in FIG. 1 have different functions among the embodiments.

In the same as described in the first embodiment, the human face detector 5 of the second embodiment detects a human face contained in an image, the number of the face and its position by detecting skin color portion of the image or by using known pattern recognition technique.

In addition, the human face detector 5 of the second embodiment determines the sex and age of a human contained in an image, with a known technique, such as, described in Japanese Un-examined Patent Publication No. 2005-165447.

Figure 8:
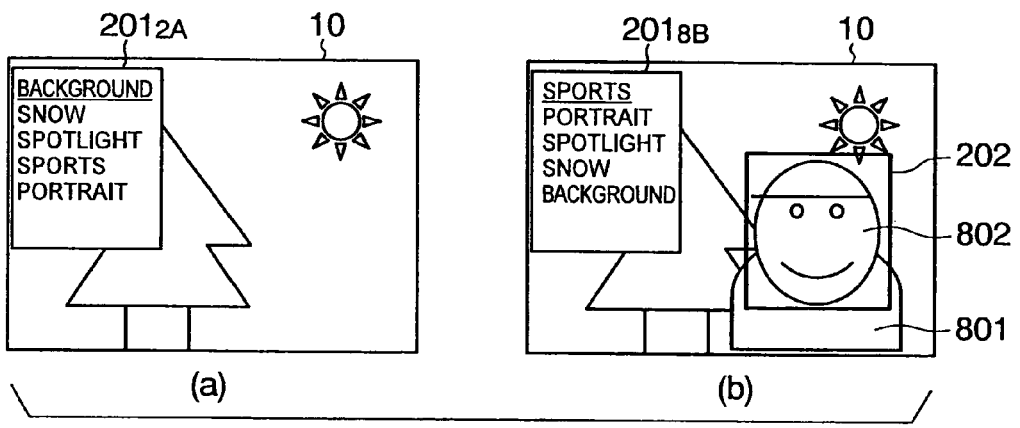
FIG. 8 shows views of exemplary images to be displayed with imaging-mode menu windows according to a second embodiment of the present invention.
Figure 9:
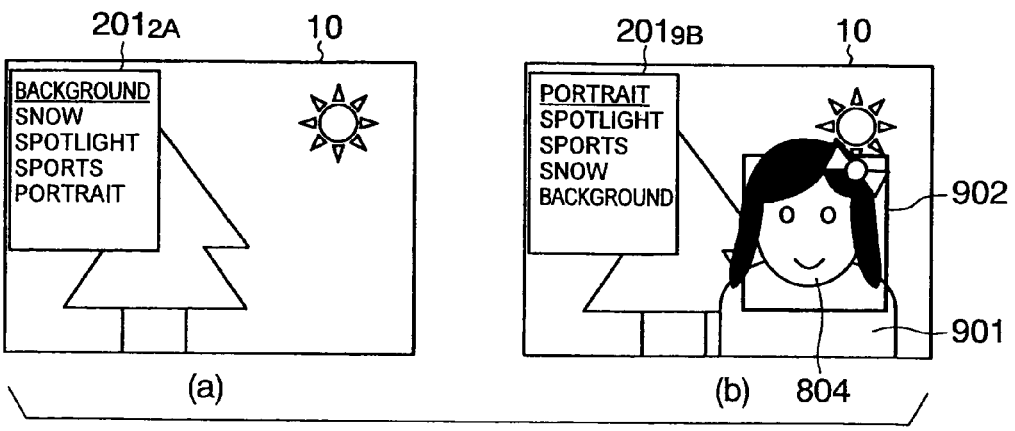
FIG. 9 shows further views of exemplary images to be displayed with imaging-mode menu windows according to the second embodiment of the present invention.

Shown in (a) and (b) of FIGS. 8 and 9 are imaging-mode menu windows used in the second embodiment. The menu window $201_{2A}$ shown in (a) of FIGS. 8 and 9 is identical to that shown in (a) of FIG. 2 for scenery imaging, hence no explanation being given for this window. On the contrary, an imaging-mode menu window $201_{8B}$ shown in (b) of FIG. 8 is used when the human face detector 5 of the second embodiment detects a face 802 of a child 801. Another imaging-mode menu window $201_{9B}$ shown in (b) of FIG. 9 is used when the detector 5 of the second embodiment detects a face 804 of a woman 902.

In the second embodiment, the human face detector 5 determines whether the age of a human contained in an image is 9 or lower, or 10 or higher. Then, the detector 5 determines that the detected human is a child when the age is 9 or lower whereas an adult when the age is 10 or higher.

Then, when the human face detector 5 of the second embodiment detects the face 802 of the child 801, as shown in (b) of FIG. 8, the controller 6 sets the imaging-mode menu window at the imaging-mode menu window $201_{8B}$ shown in (b) of FIG. 8 with the mode of SPORTS, that may be frequently used in child imaging, positioned at the top on the list, followed by the modes of PORTRAIT, SPOTLIGHT, SNOW, and BACKGROUND.

On the contrary, when the human face detector 5 of the second embodiment detects the face 804 of the woman 902, as shown in (b) of FIG. 9, the controller 6 sets the imaging-mode menu window at the imaging-mode menu window $201_{9B}$ shown in (b) of FIG. 9 with the modes of PORTRAIT and SPOTLIGHT that may be frequently used in woman imaging, followed by SPORTS that may also be used in woman imaging but may not so be frequent compared to the above two modes, followed by SNOW and BACKGROUND.

As described above, the second embodiment of imaging apparatus allows a user to set the imaging mode at a desired mode with a smaller number of operations by automatically changing the imaging mode in accordance with the sex and/or age.

In the imaging-mode menu windows used in the second embodiment, the modes of frequent use may be highlighted or indicated by a mark, such as shown in FIGS. 5 and 6 of the first embodiment, or the modes of infrequent use may not be displayed. Moreover, the imaging-mode menu windows of the second embodiment may include sub-function modes, such as shown in FIG. 7 of the first embodiment. Moreover, in the imaging-mode menu windows of the second embodiment, the number of modes to be displayed may be reduced with change in the order of listing.

Third Embodiment

Figure 10:
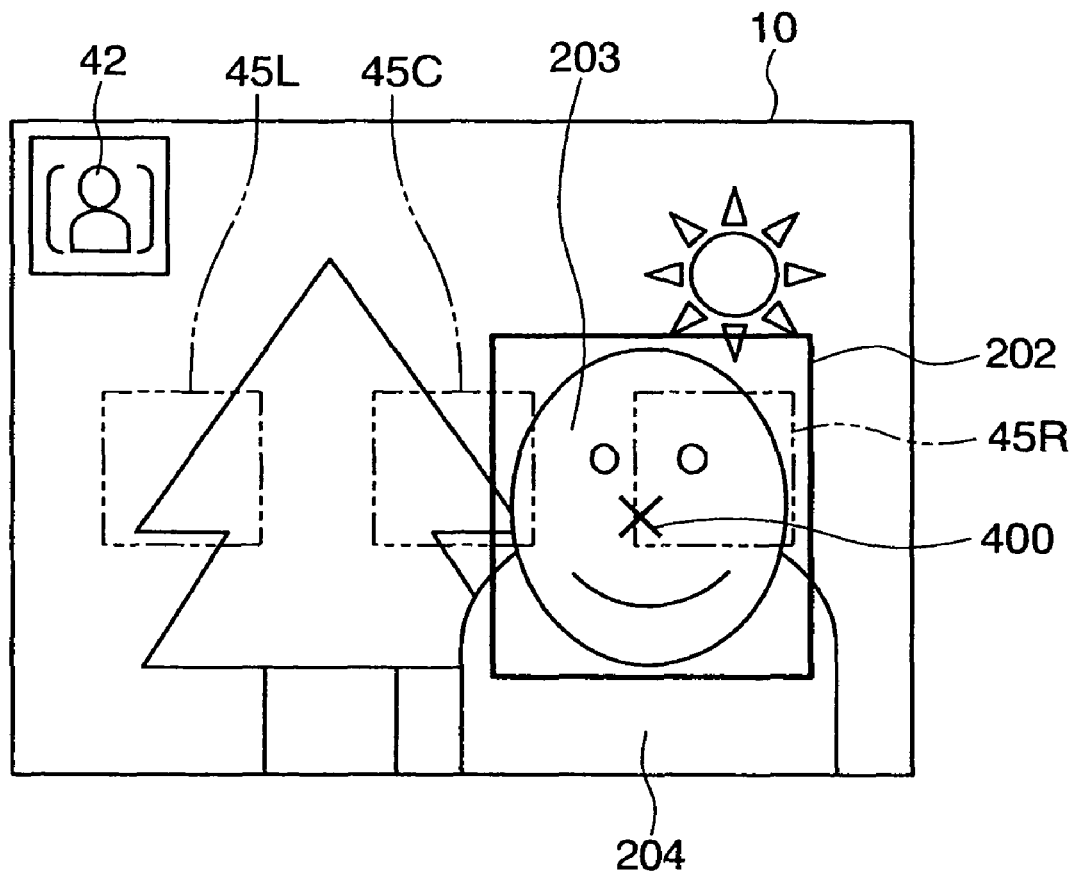
FIG. 10 shows a view of an exemplary image to be displayed according to a third embodiment of the present invention.
Figure 11:
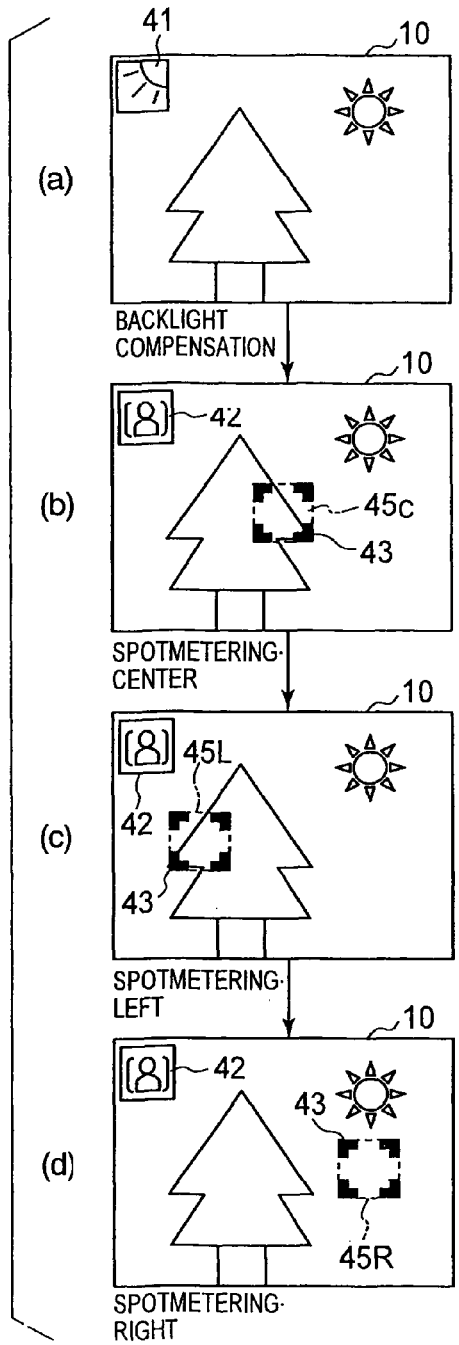
FIG. 11 shows views of exemplary images to be displayed in scenery imaging (with no human faces being detected) according to the third embodiment of the present invention.
Figure 12:
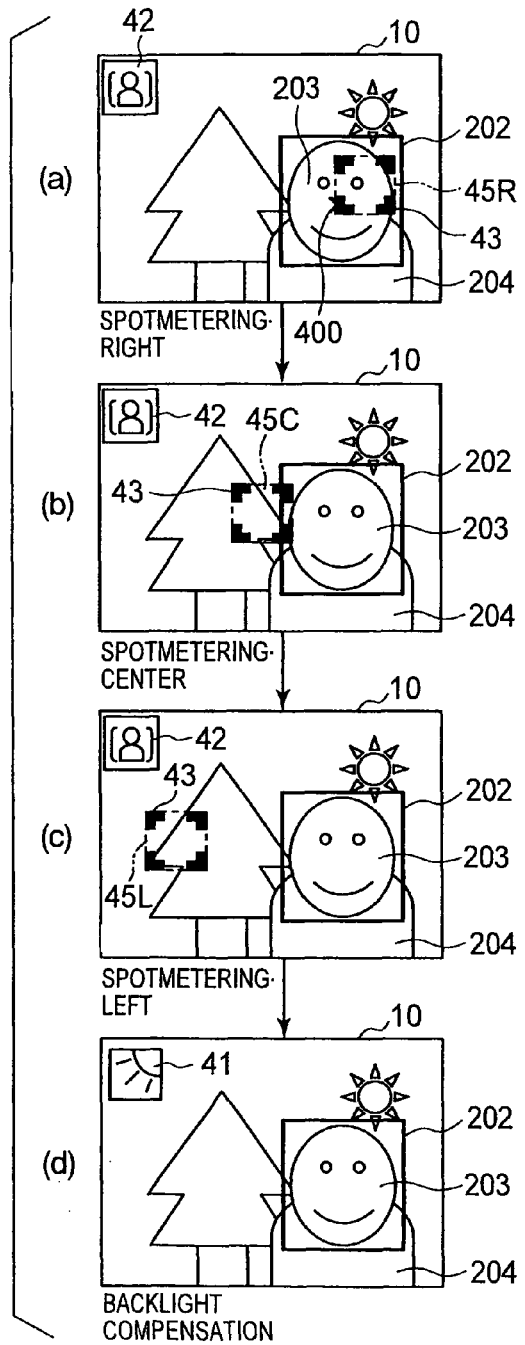
FIG. 12 shows views of exemplary images to be displayed in human imaging (with a human face being detected) according to the third embodiment of the present invention.

Described next with reference to FIGS. 10 to 12 is the third embodiment of imaging apparatus according to the present invention.

As shown in FIG. 10, the third embodiment of imaging apparatus is equipped with the following four imaging modes: BACKLIGHT COMPENSATION for the case where the image of an object with a large amount of background light would otherwise be obscured by blooming or silhouetting; SPOT METERING•CENTER based on the brightness at a center region 45C in the display screen 10, as a bench mark; SPOT METERING•RIGHT based on the brightness at a right region 45R in the screen 10; and SPOT METERING•LEFT based on the brightness at a left region 45L in the screen 10, for automatic adjustments, based on the brightness at a specific zone, to the aperture value of the aperture unit 2 and the time duration during which the imaging device 3 converts incident light to pixel signals.

The operation of the imaging apparatus in the third embodiment in scenery imaging (with no human faces being detected) will be described with reference to FIG. 11.

When a user presses the backlight-compensating/spot-metering button 72 on the operation unit 7 to activate the mode of BACKLIGHT COMPENSATION, the controller 6 controls: the imaging-condition setter 23 to set the imaging conditions suitable for BACKLIGHT COMPENSATION; and the OSD generator 8 to generate an OSD signal for a backlight-compensation mark 41 (a mode-identification image), such as shown in (a) of FIG. 11, indicating that BACKLIGHT COMPENSATION is active. The OSD signal is supplied to the OSD superimposer 9 which then superimposes the OSD signal on the video signals supplied from the video signal processor 4. The video signals superimposed with the OSD signal are then supplied to the display screen 10, thus an image shown in (a) of FIG. 11 is displayed on the screen 10.

When a user presses again the backlight-compensating/spot-metering button 72 to activate SPOT METERING while BACKLIGHT COMPENSATION is on, the controller 6 controls: the imaging-condition setter 23 to set the imaging conditions suitable for SPOT METERING; and the OSD generator 8 to generate an OSD signal for a spot-metering mark 42 (a mode-identification image) indicating that SPOT METERING is active and also a spot-metering region window 43 indicating a region of brightness, the bench mark for performing spot metering, such as shown in (b) to (d) of FIG. 11. The OSD signal is supplied to the OSD superimposer 9 which then superimposes the OSD signal on the video signals supplied from the video signal processor 4. The video signals superimposed with the OSD signal are then supplied to the display screen 10, thus an image shown in (b) to (d) of FIG. 11 is displayed on the screen 10.

When no human faces are detected, the controller 6 sets the four modes of BACKLIGHT COMPENSATION, SPOT METERING•CENTER, SPOT METERING•RIGHT and SPOT METERING•LEFT at MODE 1, MODE 2, MODE 3, and MODE 4, respectively. This mode setting allows a user to switch the imaging mode in order of MODE 1→MODE 2→MODE 3→MODE 4, and MODE OFF to deactivate the imaging mode, whenever the user presses the backlight-compensating/spot-metering button 72.

The mode set at MODE 1 is BACKLIGHT COMPENSATION that may be used frequently when no human faces are detected, compared to SPOT METERING•CENTER, SPOT METERING•RIGHT and SPOT METERING•LEFT. The mode set at MODE 2 is SPOT METERING•CENTER because spot metering seems to be performed mostly at the center of an image. The modes set at MODE 3 and MODE 4 are SPOT METERING•RIGHT and SPOT METERING•LEFT. Either mode may be set at MODE 3 or MODE 4 because it seems that there is no particular difference in frequency of use between SPOT METERING•RIGHT and SPOT METERING•LEFT.

According to the imaging-mode settings, and when no human faces are detected, the mode of BACKLIGHT COMPENSATION becomes active when a user presses the backlight-compensating/spot-metering button 72 at first. The active mode changes in order of SPOT METERING•CENTER→SPOT METERING•RIGHT→SPOT METERING•LEFT (or→SPOT METERING•LEFT→SPOT METERING•RIGHT) followed by MODE OFF whenever the user presses the button 72.

Described next with reference to FIG. 12 is the operation of the imaging apparatus of the third embodiment in human imaging (with a human face being detected).

In FIG. 12, the human face detector 5 is detecting a face 203 of a human 204 at the right side of the display screen 10. Based on the face detection information from the detector 5, the controller 6 determines which of the regions 45C, 45R and 45L is closest to the center 400 of the face 203. As already described, the brightness at the right region 45R, the center region 45C, and the left region 45L shown in (a), (b) and (c), respectively, of FIG. 12 is used as a bench mark for spot metering. The distance between each of the regions 45C, 45R and 45L and the center 400 may be detected by, for example, the number of pixels from each region to the center or vise versa.

As shown in (a) of FIG. 12, the region closest to the center 400 of the face 203 is the right region 45R on the display screen 10. Then, the controller 6 gives higher priority to SPOT METERING than BACKLIGHT COMPENSATION that may not be used frequently when a human face is being detected. And, then the controller 6 sets SPOT METERING•RIGHT at MODE 1, that is the imaging mode based on the brightness on the right region 45R closest to the center 400 of the face 203, because it is highly likely that a user will perform spot metering on the face 203.

Moreover, the controller 6 sets SPOT METERING•CENTER at MODE 2 next to MODE 1, because it is highly likely that spot metering is performed at the center in the display screen 10, followed by SPOT METERING•LEFT at MODE 3. The mode of BACKLIGHT COMPENSATION is set at MODE 4 because this mode is least likely to be used when a human face is being detected.

As described above, while the face 203 of the human 204 is being detected at the right side of the display screen 10, the mode of SPOT METERING•RIGHT becomes active when a user presses the backlight-compensating/spot-metering button 72 at first. The imaging mode is then switched in order of SPOT METERING•CENTER→SPOT METERING•LEFT→BACKLIGHT COMPENSATION, and then to MODE OFF to deactivate the imaging mode, whenever the user presses the button 72.

The operation of the third embodiment of imaging apparatus will be described further with respect to a flow chart shown in FIG. 13.

When power is on for the imaging apparatus shown in FIG. 1, the controller 6 activates the human-face detecting function of the human face detector 5 in Step S101.

Then, the controller 6 determines in Step S102 whether BACKLIGHT COMPENSATION/SPOT METERING is active.

A user could be perplexed when the order of imaging modes changes while BACKLIGHT COMPENSATION/SPOT METERING is active. Thus, the process moves to Step S108 when it is determined that BACKLIGHT COMPENSATION/SPOT METERING is active (YES in Step S102) whereas to Step S103 when it is determined that BACKLIGHT COMPENSATION/SPOT METERING is not active (NO in Step S102).

When it is determined that BACKLIGHT COMPENSATION/SPOT METERING is not active (NO in Step S102), the controller 6 determines, in Step S103, whether a human face is being detected based on the face detection information from the human face detector 5.

When it is determined that no human faces are being detected (NO in Step S103), the controller 6 sets the order of imaging modes at a scenery-imaging mode order of BACKLIGHT COMPENSATION, SPOT METERING•CENTER, SPOT METERING•LEFT and SPOT METERING•RIGHT, in Step S104.

On the contrary, when it is determined that the face 203 of the human 204 is being detected at the right side of the display screen 10 as shown in (a) of FIG. 12 (YES in Step S103), the controller 6 switches the order of imaging modes to a face-detected mode order of SPOT METERING•RIGHT, SPOT METERING•CENTER, SPOT METERING•LEFT and BACKLIGHT COMPENSATION in Step S105.

In Step S104 or S015, when the imaging-mode order is switched as described above, the order of the mode-identification images (indicating the imaging mode active at present), such as the backlight-compensation mark 41 and the spot-metering mark 42 shown in (a) and (b), respectively, is also switched.

The controller 6 further determines in Step S106 whether the backlight-compensating/spot-metering button 72 is pressed by a user. When the process enters Step S106, any imaging mode has not been active due to NO in Step S102.

When it is determined that the backlight-compensating/spot-metering button 72 is pressed by a user (YES in Step S106), the controller 6 activates MODE 1 in Step S107 while supplying control signals for MODE 1 to the aperture driver 22 for aperture value adjustments and to the imaging device 3 for adjustments to the time duration during which the imaging device 3 converts the incident light to pixel signals. Then, the process returns to Step S101.

When it is determined that the backlight-compensating/spot-metering button 72 is not pressed by a user (NO in Step S106), the process returns to Step S101.

On the contrary, when it is determined that BACKLIGHT COMPENSATION/SPOT METERING is active (YES in Step S102), the process moves to Step S108 in which the he controller 6 determines whether the backlight-compensating/spot-metering button 72 is pressed by a user.

When it is determined that the backlight-compensating/spot-metering button 72 is not pressed by a user (NO in Step S108), the process returns to Step S101.

On the contrary, when it is determined that the backlight-compensating/spot-metering button 72 is pressed by a user (YES in Step S108), the controller 6 determines which imaging mode is active at present, in Step S109.

When it is determined that one of MODE 1, MODE 2, and MODE 3 is active (MODE 1, 2 or 3 in Step S109), the controller 6 switches the active mode to the next mode, for example, from MODE 1 to MODE 2, from MODE 2 to MODE 3 or from MODE 3 to MODE 4, in Step S110. Then, the process returns to Step S101.

On the contrary, when it is determined that MODE 4 is active (MODE 4 in Step S109), the controller 6 switches the active mode to MODE OFF, in Step S111. Then, the process returns to Step S101.

As described with reference to the flow chart of FIG. 13, the imaging modes of BACKLIGHT COMPENSATION, SPOT METERING•CENTER, SPOT METERING•LEFT and SPOT METERING•RIGHT can be set in an appropriate order between the cases where no human faces are detected and a human face is being detected.

Figure 14:
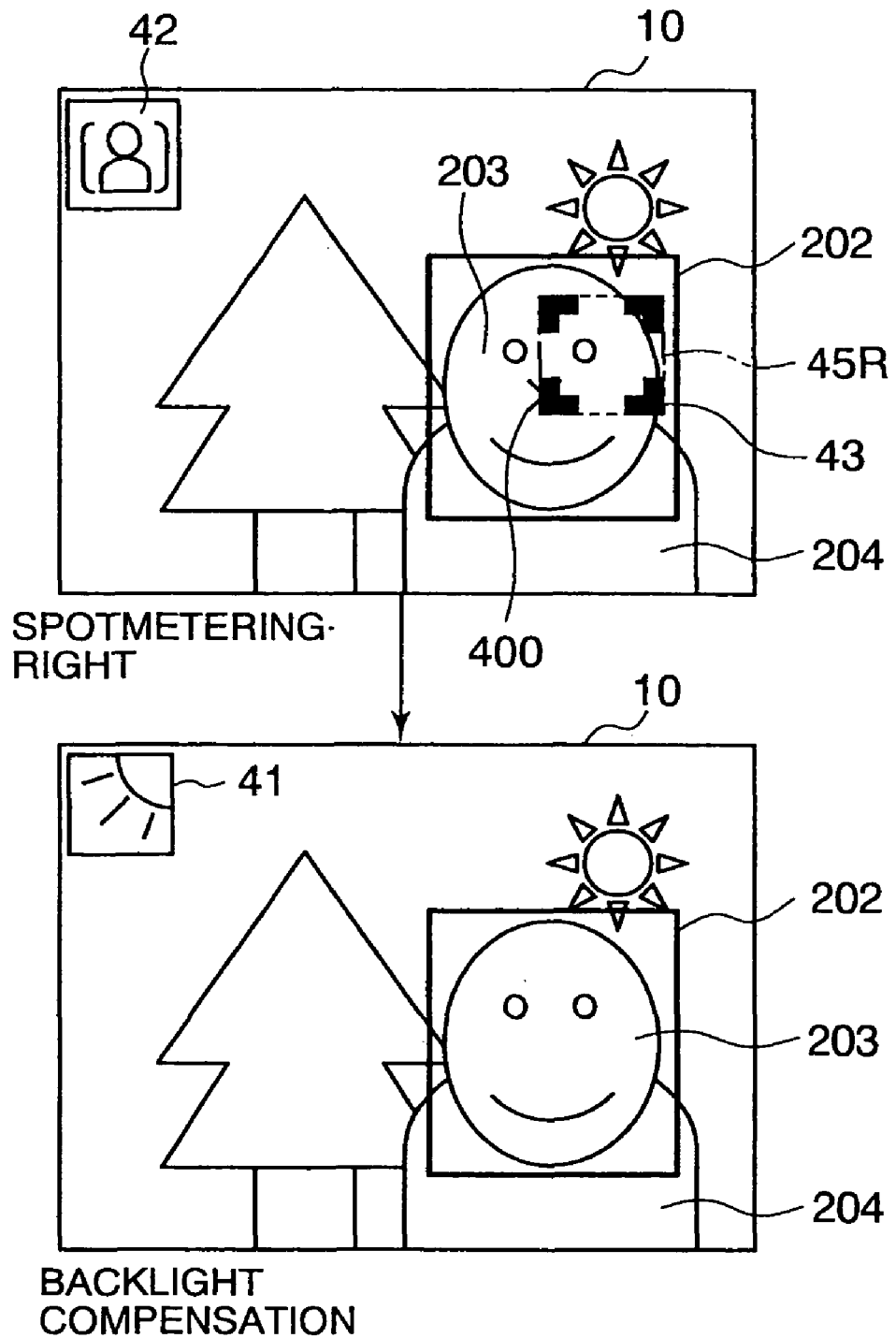
FIG. 14 shows views of exemplary images to be displayed in imaging mode settings in the case where a human face is being detected according to the third embodiment of the present invention.

Described next with reference to FIG. 14 is another type of imaging-mode order settings in the case where a human face is being detected.

Shown in FIG. 14 is that the human face detector 5 is detecting the face 203 of the human 204 at the right side of the display screen 10.

Based on the face detection information from the human face detector 5, the controller 6 gives higher priority to SPOT METERING than BACKLIGHT COMPENSATION that may not be used frequently when a human face is being detected.

And then, the controller 6 sets SPOT METERING•RIGHT at MODE 1 because it is highly likely that a user will perform spot metering on the detected face 203. Moreover, the controller 6 sets BACKLIGHT COMPENSATION at MODE 2 because it is highly likely that a user will not perform spot metering on the regions in the display screen 10 other than the region in which the face 203 is being detected. No imaging modes are set at MODE 3 and MODE 4. Thus, the present invention with the imaging-mode order settings according to FIG. 14 uses MODE 1 and MODE 2 only without using MODE 3 and MODE 4.

Accordingly, while the human face detector 5 is detecting the face 203 of the human 204 at the right side of the display screen 10, as shown in FIG. 14, the controller 6 activates the mode of SPOT METERING•RIGHT when a user presses the backlight-compensating/spot-metering button 72 at first, switches the mode to BACKLIGHT COMPENSATION when the user presses the button 72 again, and then to MODE OFF when the user presses the button 72 once again.

As described above, the present invention employing the imaging-mode order settings according to FIG. 14 offers simpler imaging operation by decreasing the number of imaging modes to be used.

The operation of the imaging apparatus of the present invention, in accordance with the imaging-mode order settings shown in FIG. 14 in which MODE 1 and MODE 2 are only used when a human face is being detected, will be described further with reference to a flow chart shown in FIG. 15.

Figure 13:
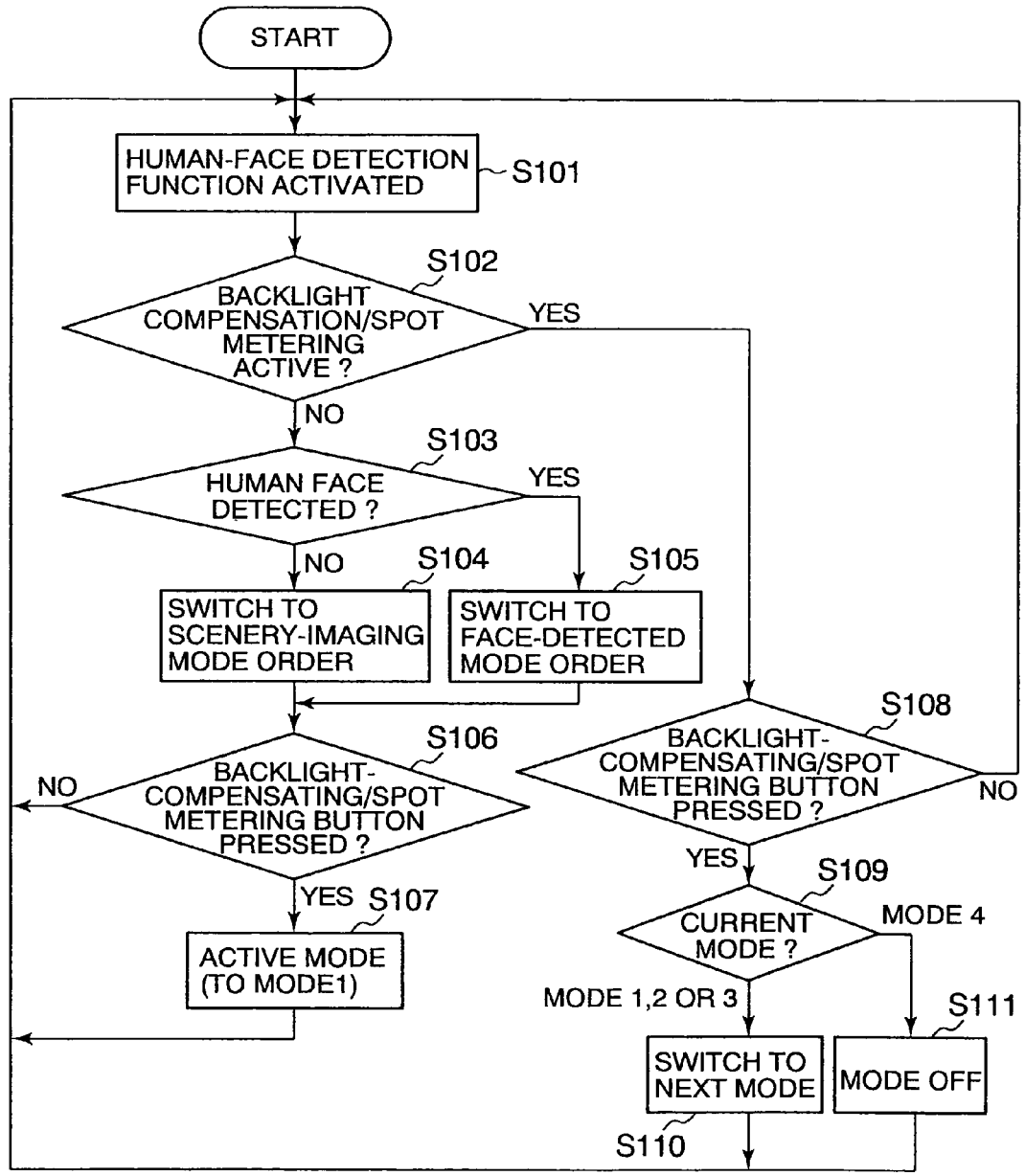
FIG. 13 shows a flow chart for an operation of the third embodiment of imaging apparatus according to the present invention.
Figure 15:
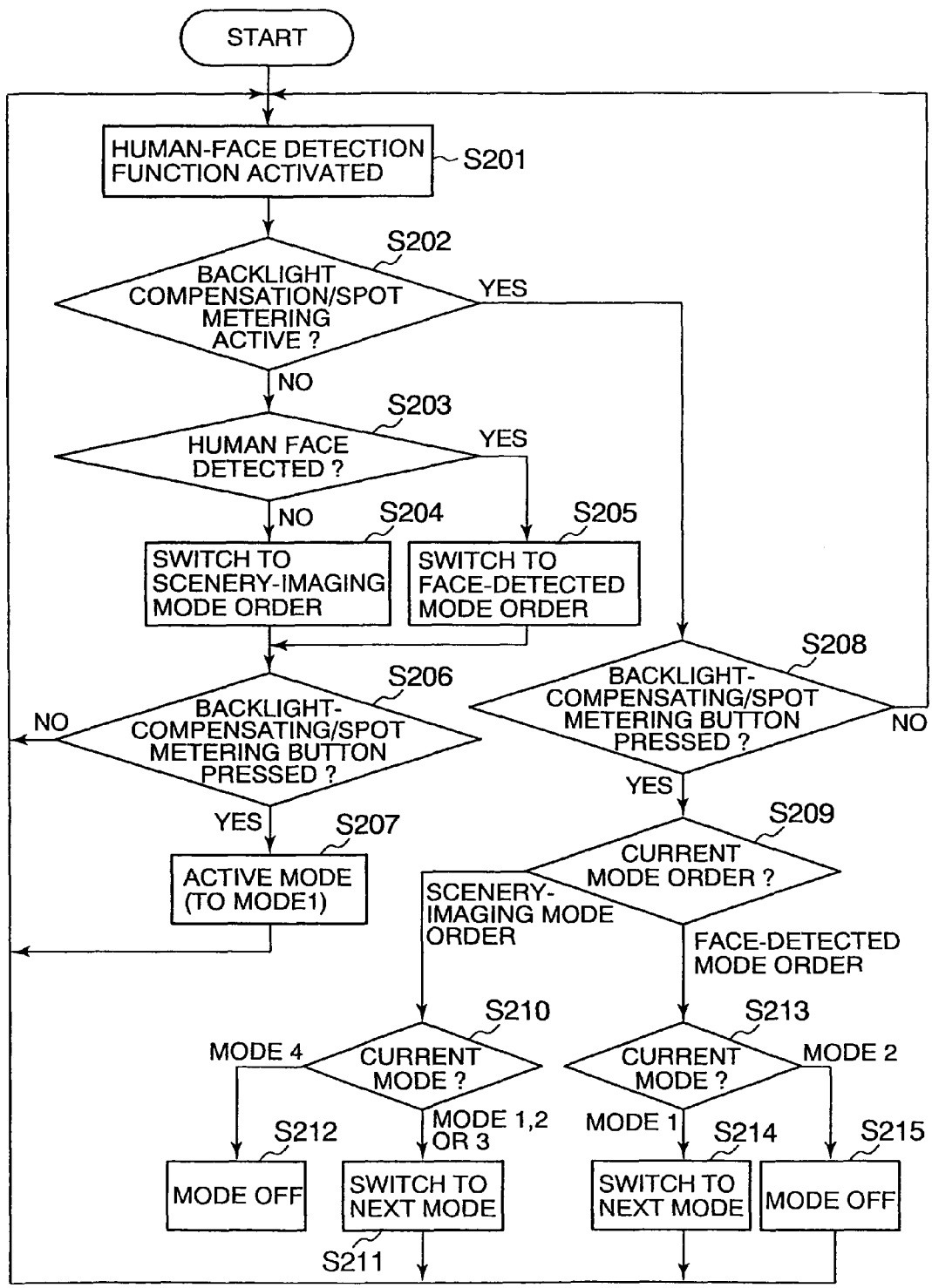
FIG. 15 shows a flow chart for another operation of the third embodiment of imaging apparatus according to the present invention.

In the flow chart of FIG. 15, Steps S201 to S208 are identical to Steps S101 to S108 shown in FIG. 13. Thus, the description with respect to FIG. 15 focuses on Step 209 and the succeeding steps.

When it is determined in Step S208 that the backlight-compensating/spot-metering button 72 is pressed by a user (YES in Step S208), the controller 6 determines in Step S209 whether the present order of imaging modes to be switched is a scenery-imaging mode order for the case where no faces are being detected (MODE 1 to 4 usable) or a face-detected mode order for the case where a human face is being detected (MODE 1 and 2 only usable).

Concerning Step S208 and the succeeding steps in FIG. 15, since no imaging modes are active just after the imaging apparatus is powered on, the controller 6 will never determine in Step S202 that BACKLIGHT COMPENSATION/SPOT METERING is active (YES in Step S202) until it determines in Step S206 that the backlight-compensating/spot-metering button 72 is pressed by a user (YES in Step S206). Thus, the face detection Step S203 is executed at least once before the process enters Step S208, and hence Step S209 is executed based on the decision of Step S203. The same is applied to Steps S309 and S410 in FIGS. 17 and 20, respectively, which will be described later.

When the current order of imaging modes to be switched is determined as the face-detected mode order in Step S209, the controller 6 determines which mode is active at present in Step S213.

When MODE 1 is active at present in Step S213, the controller 6 switches the imaging mode to the next mode, or MODE 1 to MODE 2 in Step S214. On the contrary, when MODE 2 is active at present in Step S213, the controller 6 puts the imaging mode to MODE OFF in Step S215.

On the contrary, when the current order of imaging modes to be switched is determined as the scenery-imaging mode order in Step S209, the controller 6 determines in Step S210 which mode is active at present.

When any one of MODE 1, MODE 2 and MODE 3 is active at present in Step S210, the controller 6 switches the imaging mode to the next mode in Step S211. On the contrary, when MODE 4 is active at present in Step S210, the controller 6 puts the imaging mode to MODE OFF in Step S212.

As described with respect to FIG. 15, the present invention allows a user to select an imaging mode easily by decreasing the number of imaging modes to be used when a human face is being detected. In FIG. 15, the number of imaging modes to be used may further be decreased and also the mode order may be changed.

Fourth Embodiment

Figure 16:
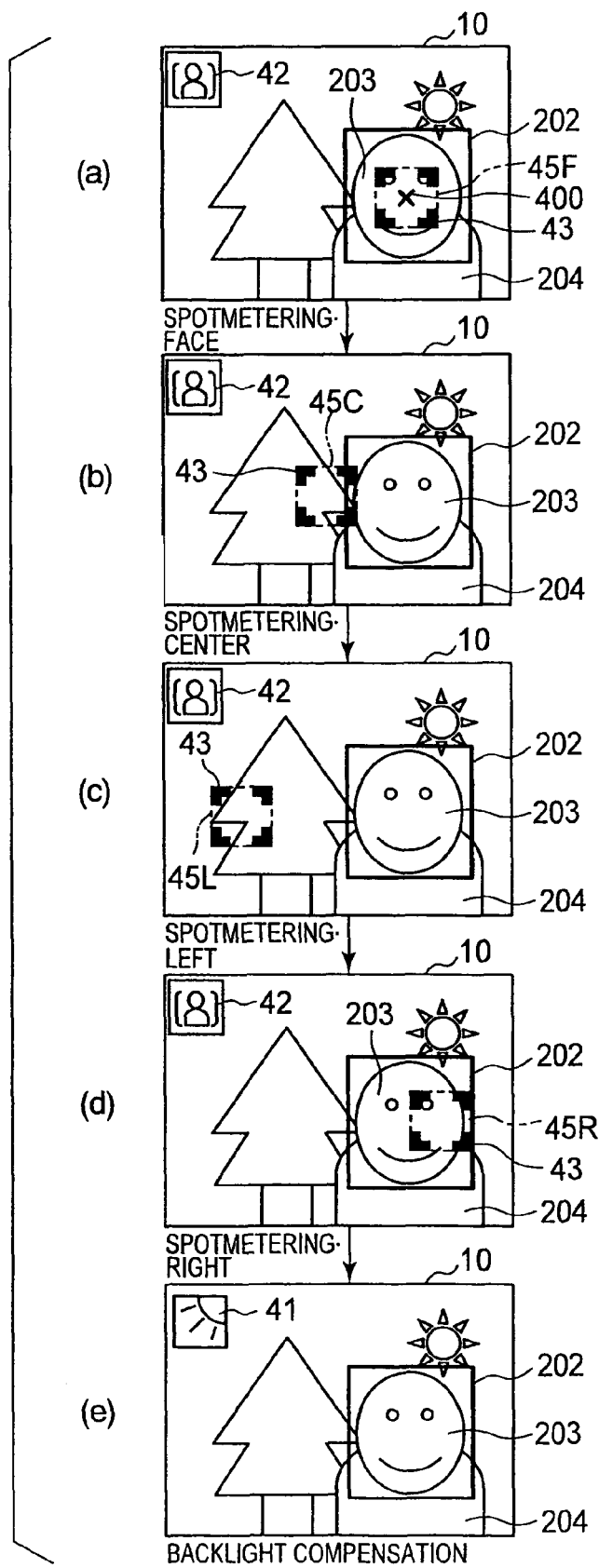
FIG. 16 shows views of exemplary images to be displayed according to a fourth embodiment of the present invention.
Figure 17:
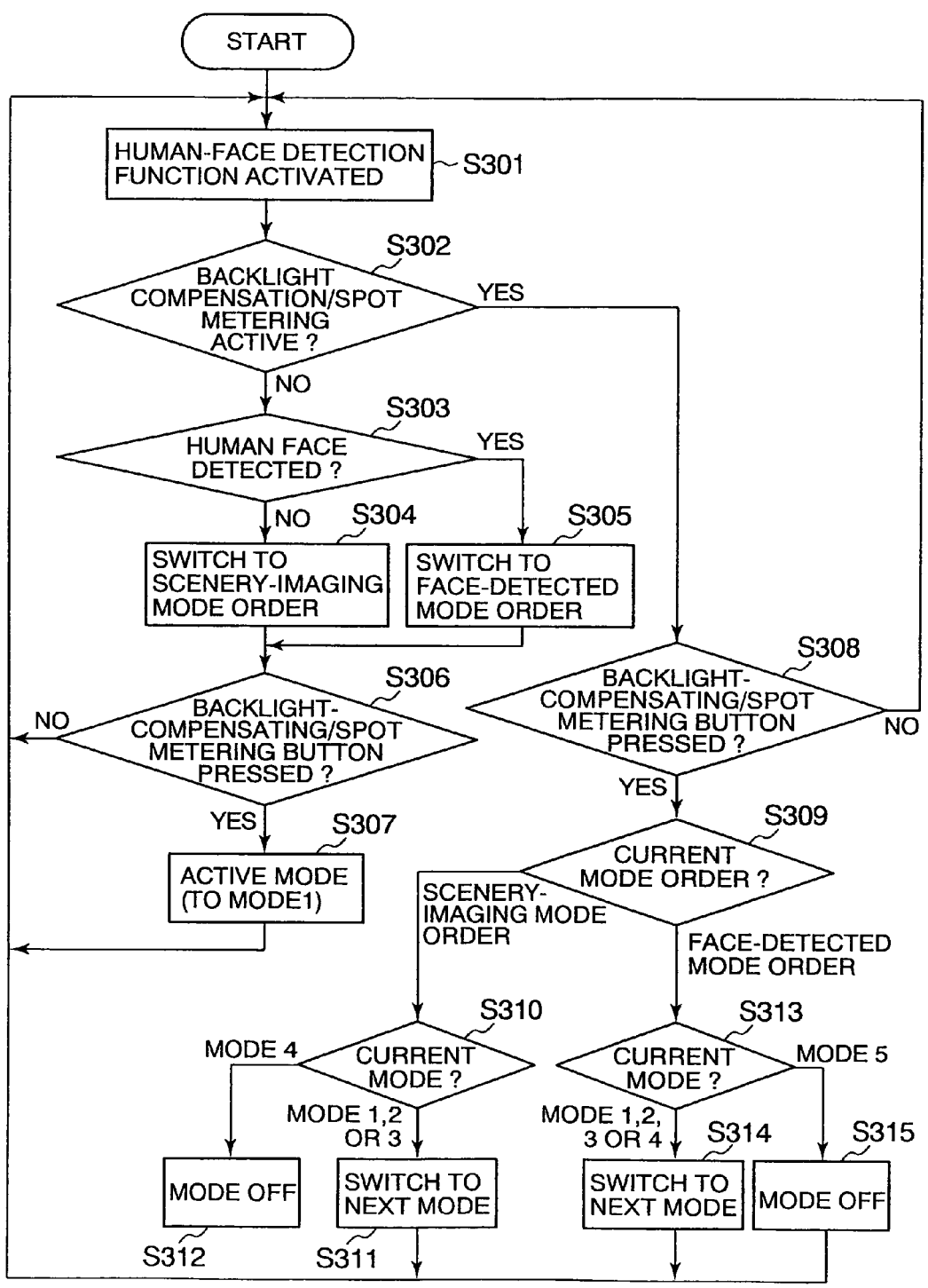
FIG. 17 shows a flow chart for an operation of the fourth embodiment of imaging apparatus according to the present invention.

Described next with reference to FIGS. 16 and 17 is the fourth embodiment of imaging apparatus, which is an advanced version of the third embodiment, but the same as the first embodiment in the overall configuration. The operation in the fourth embodiment in the scenery-imaging mode in which no faces are being detected is the same as the second embodiment. Therefore, the following description of the fourth embodiment will focus on the face-detected mode in which a human face is being detected.

The fourth embodiment uses the mode of SPOT METERING•FACE based on the brightness at a human face region detected by the human face detector 5, in addition the same modes as used in the third embodiment, five imaging modes in total when a human face is being detected.

In the fourth embodiment, when the human face detector 5 detects the face 203 of the human 204, the controller 6 outputs a control signal to the OSD generator 8 so that the generator 8 generates an OSD signal for a face-detection zone window 43 having a frame that covers the face 203 based on the face detection information from the detector 5. The OSD signal is then supplied to the OSD superimposer 9. The OSD superimposer 9 superimposes the OSD signal on the video signals supplied from the video signal processor 4. The video signals superimposed with the OSD signal are then supplied to the display screen 10, thus an image with the face-detection zone window 43 that surrounds the face 203 is displayed on the display screen 10, as shown in (a) of FIG. 16.

Shown in FIG. 16 is that the human face detector 5 is detecting the face 203 of the human 204 at the right side of the display screen 10. It is highly likely that a user will use the mode of SPOT METERING on the region of the face 203 while the detector 5 is detecting the face 203.

Then, the controller 6 sets the mode of SPOT METERING•FACE at MODE 1, which is an imaging mode based on the brightness at a region 45F with the center 400 that is the center of the face 203 of the human 204.

Next, the controller 6 determines which of the regions 45C, 45R and 45L is closest to the center 400 of the face 203 of the human 204. As already described, the brightness at the center region 45C, the left region 45L, and the right region 45R shown in (b), (c) and (d), respectively, of FIG. 16 is used as a bench mark for spot metering.

The controller 6 then allocates the modes of SPOT METERING so that the mode for the region closest to the face 203 of the human 204 becomes active after the other modes.

In the case of FIG. 16, the controller 6 allocates the modes of SPOT METERING in order of SPOT METERING•CENTER, SPOT METERING•LEFT, and SPOT METERING•RIGHT so that SPOT METERING•RIGHT becomes active lastly. This is because the region closest to the center 400 of the face 203 is the region 45R at the right side of the display screen 10.

In detail, the controller 6 sets SPOT METERING•CENTER, SPOT METERING•LEFT, SPOT METERING•RIGHT, and BACKLIGHT COMPENSATION at MODE 2, MODE 3, MODE 4, and MODE 5, respectively. The mode of SPOT METERING•CENTER is allocated as prior to SPOT METERING•LEFT because SPOT METERING is mostly conducted at the screen center. The mode of BACKLIGHT COMPENSATION is allocated to the last MODE 5 because it is highly likely that this mode may not so be used frequent compared to the other mode when a human face is being detected.

Accordingly, while the face 203 of the human 204 is being detected at the right side of the display screen 10, the mode of SPOT METERING•FACE becomes active when a user presses the backlight-compensating/spot-metering button 72 at first. The imaging mode is switched to SPOT METERING•CENTER→SPOT METERING•LEFT→BACKLIGHT COMPENSATION, and then to MODE OFF to deactivate the imaging mode, whenever the user presses the button 72.

The operation of the fourth embodiment of imaging apparatus will be described further with respect to a flow chart shown in FIG. 17. The description starts from Step 313 because Steps S301 to S312 are identical to Steps S201 to S212 shown in FIG. 15.

When the current order of imaging modes to be switched is determined as the face-detected mode order in Step S309, the controller 6 determines which mode is active at present in Step S313.

When any one of the modes MODE 1 to 4 is active at present in Step S313, the controller 6 switches the imaging mode to the next mode, or MODE 1 to MODE 2, MODE 2 to MODE 3, MODE 3 to MODE 4, or MODE 4 to MODE 5 in Step S314. On the contrary, when MODE 5 is active at present in Step S313, the controller 6 puts the imaging mode to MODE OFF in Step S315.

As described with respect to FIG. 17, the present invention allows a user to select an imaging mode with a smaller number of operations by setting SPOT METERING•FACE at MODE 1, which may be used frequently when a human face is being detected.

Figure 18:
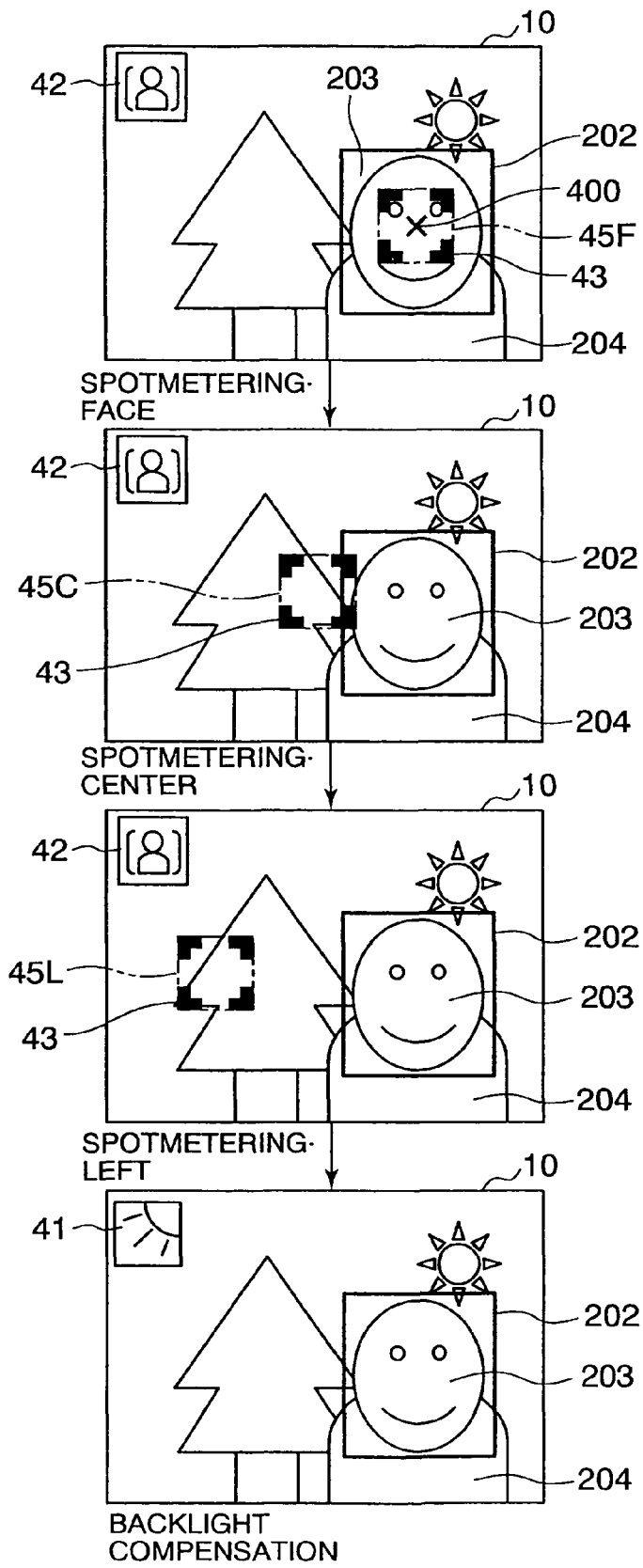
FIG. 18 shows views of exemplary images to be displayed in imaging mode settings in the case where a human face is being detected according to the fourth embodiment of the present invention.

As a modification to the fourth embodiment, SPOT METERING for the region closest to a detected human face may be omitted, which is shown in FIG. 18.

In detail, the controller 6 determines which of the regions 45C, 405R and 45L is closest to the center 400 of the face 203 of the human 204, and turns off SPOT METERING for the region closest to the center 400.

In the case of FIG. 18, the mode to be turned off is SPOT METERING•RIGHT, because the region 45R is closest to the center 400 of the face 203 of the human 204.

Then, the controller 6 sets SPOT METERING•FACE, SPOT METERING•CENTER and SPOT METERING•LEFT at MODE 1, MODE 2, and MODE 3, respectively, and BACKLIGHT COMPENSATION at MODE 4, which may not be used frequently when a human face is being detected, compared to the other modes. The mode not used in this modification is MODE 5. The flow chart for the operation in the modification is identical to that shown in FIG. 13.

Fifth Embodiment

Figure 19:
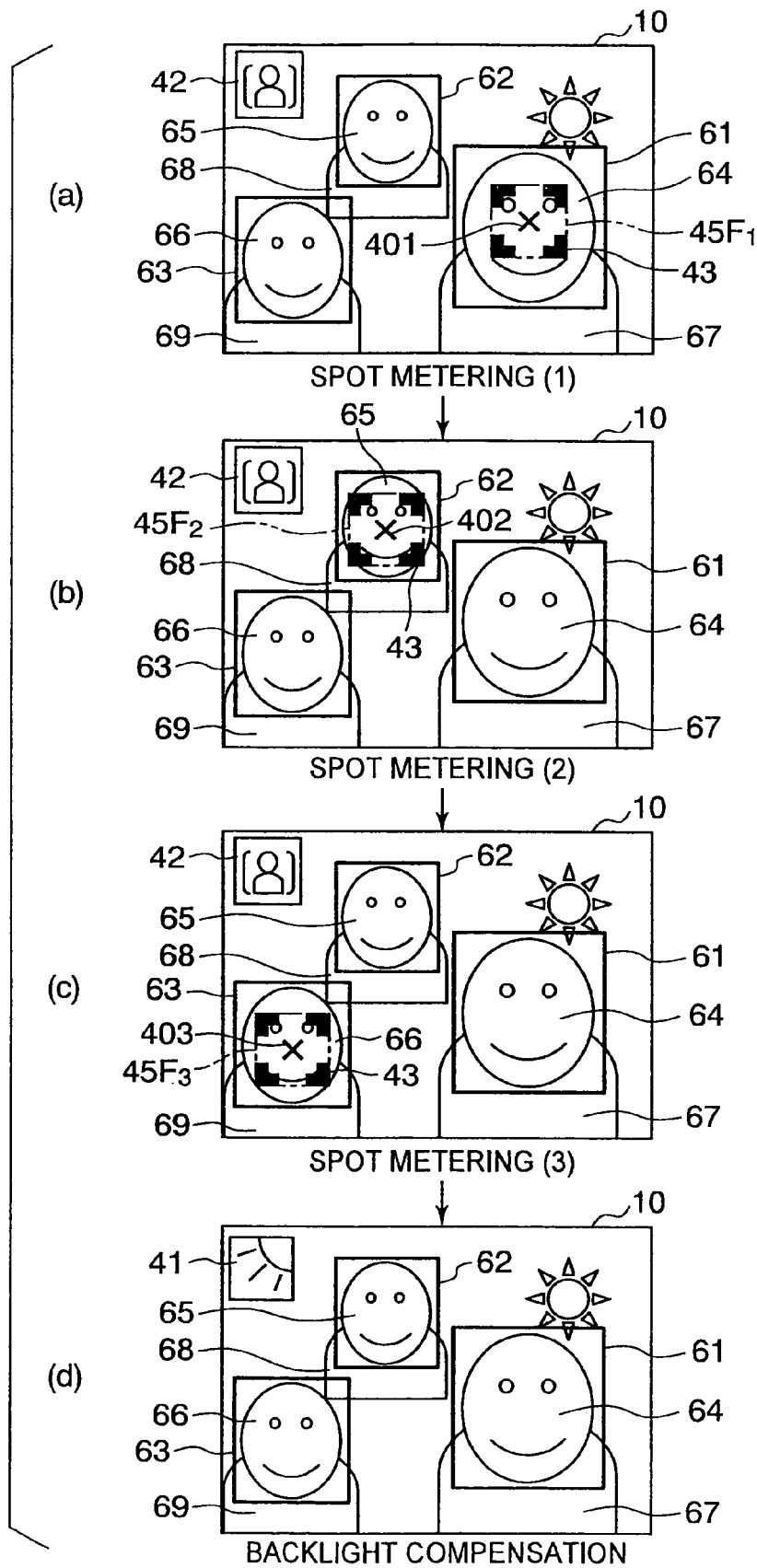
FIG. 19 shows views of exemplary images to be displayed in imaging mode settings in the case where a plurality of human faces are being detected according to the fourth embodiment of the present invention.
Figure 20:
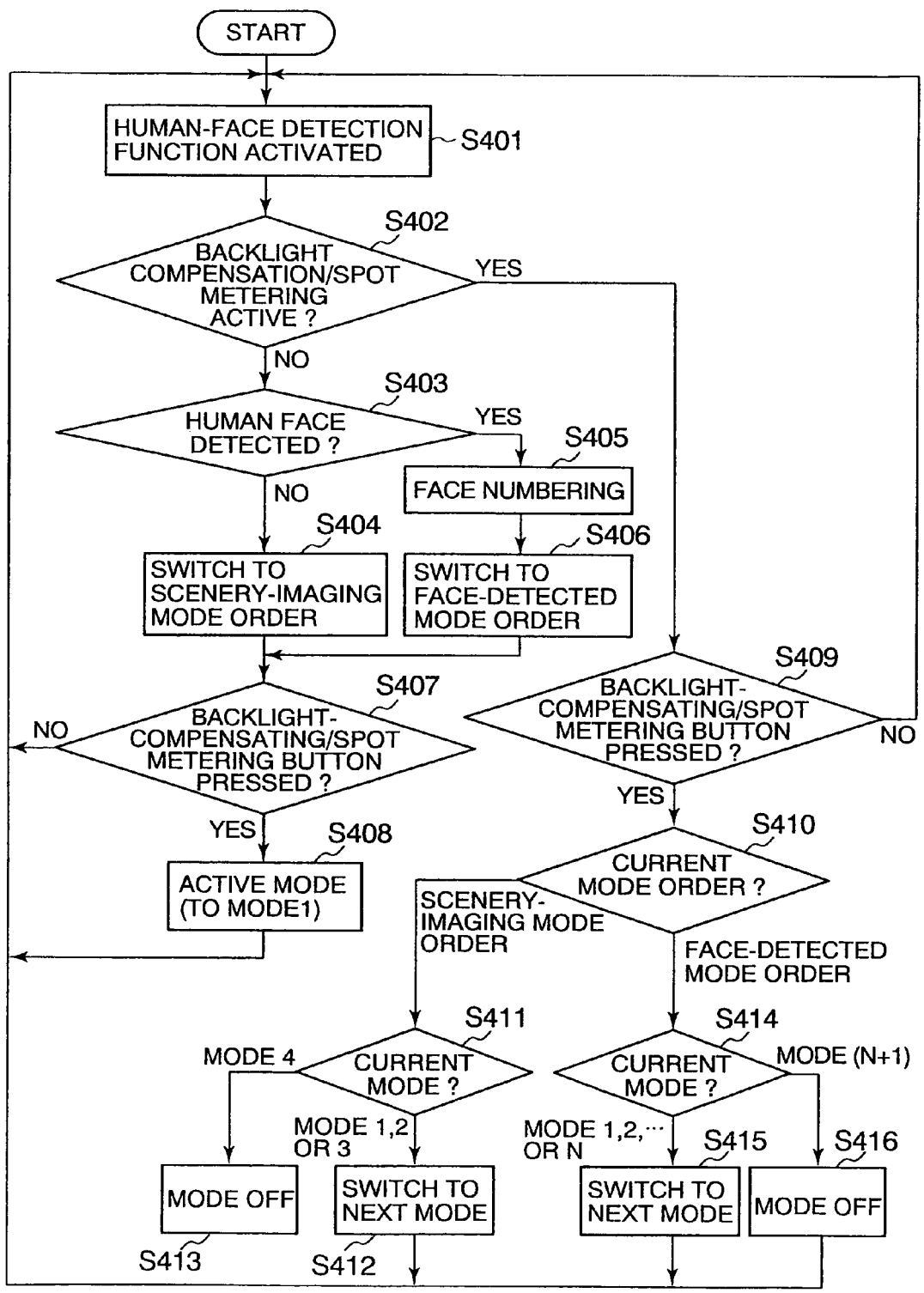
FIG. 20 shows a flow chart for an operation of the fourth embodiment of imaging apparatus according to the present invention.

Described next with reference to FIGS. 19 and 20 is the fifth embodiment of imaging apparatus, which is an advanced version of the fourth embodiment, but the same as the first embodiment in the overall configuration. The fifth embodiment uses a larger number of imaging modes than the fourth embodiment for the case where a plurality of human faces are being detected by the human face detector 5.

The imaging mode used in the fifth embodiment is SPOT METERING based on the brightness at a region of each human face detected by the human face detector 5. In detail, the mode of SPOT METERING used in this embodiment includes SPOT METERING•FACE (1), SPOT METERING•FACE (2), SPOT METERING•FACE (3), . . . , and SPOT METERING•FACE (N) for N human faces when detected by the detector 5 (N being a positive integer of 2 or more). Also used in this embodiment is BACKLIGHT COMPENSATION. Thus, the imaging modes used in this embodiment are METERING•FACE (1) to (N) and BACKLIGHT COMPENSATION, (N+1) modes in total.

When any of the (N+1) modes becomes active, the controller 6 sends control signals to the aperture driver 22 and the imaging device 3 for the active mode, and switches the imaging mode among the (N+1) modes whenever a user presses the backlight-compensating/spot-metering button 72.

The fifth embodiment is described in detail with respect to FIG. 19.

When the human face detector 5 detects human faces, for example, three faces, based on the face detection information from the detector 5, the controller 6 outputs a control signal to the OSD generator 8 so that the generator 8 generates an OSD signal for face-detection zone windows 61, 62 and 63 having frames that cover faces 64, 65 and 66, respectively.

The OSD signal is then supplied to the OSD superimposer 9. The OSD superimposer 9 superimposes the OSD signal on the video signals supplied from the video signal processor 4. The video signals superimposed with the OSD signal are then supplied to the display screen 10, thus an image with the face-detection zone windows 61, 62 and 63 having the frames that covers the faces 64, 65 and 66, respectively, is displayed on the screen 10, as shown in (a) of FIG. 19.

In the case where the human face detector 5 is detecting the three faces 64, 65 and 66 of humans 67, 68 and 69, respectively, as shown in (a) of FIG. 19, the controller 6 assigns the numbers (1), (2) and (3) to the faces 64, 65 and 66, respectively, from the right side of the display screen 10. Thus, the faces 64, 65 and 66 are expressed as the faces (1) 64, (2) 65 and (3) 66, respectively. The numbering may start from the left side or center of the screen 10.

The imaging modes of SPOT METERING used in the fifth embodiment are as follows, for the faces (1) 64, (2) 65 and (3) 66:

SPOT METERING•FACE (1): based on the brightness at a region 45F₁ with a center 401 that is the center of the face (1) 64 of the human 67, as shown in (a) of FIG. 19;

SPOT METERING•FACE (2): based on the brightness at a region 45F₂ with a center 402 that is the center of the face (2) 65 of the human 68, as shown in (b) of FIG. 19; and SPOT METERING•FACE (3): based on the brightness at a region 45F₃ with a center 403 that is the center of the face (3) 66 of the human 69, as shown in (c) of FIG. 19.

The controller 5 sets these imaging modes at MODE 1 to 3 and BACKLIGHT COMPENSATION at MODE 4 so that the modes can be switched in such an order of MODE 1→MODE 2→MODE 1→MODE 3→MODE 4→MODE OFF.

In detail, the imaging modes set at MODE 1 to 4 in this embodiment are: SPOT METERING•FACE (1) at MODE 1; SPOT METERING•FACE (2) at MODE 2; SPOT METERING•FACE (3) at MODE 3; and BACKLIGHT COMPENSATION at MODE 4. The mode setting is based on a presumption that SPOT METERING will be used more often than BACKLIGHT COMPENSATION when human faces are detected and SPOT METERING will be performed at a region of each face.

When the human face detector 5 is detecting three human faces, the controller 5 performs the imaging mode setting as described above. Thus, SPOT METERING•FACE (1) becomes active when a user presses the backlight-compensating/spot-metering button 72 at first. The active mode then changes in order of SPOT METERING•FACE (2)→SPOT METERING•FACE (3)→BACKLIGHT COMPENSATION, followed by MODE OFF whenever the user presses the button 72.

The fifth embodiment can be applied to an N (N being a positive integer of 2 or more) number of human faces, in addition to the three faces as shown in FIG. 19. In this case, when the human face detector 5 detects the N number of human faces, the controller 5 sets SPOT METERING•FACE (1), . . . , SPOT METERING•FACE (N) at MODE 1, . . . , MODE N, respectively, and BACKLIGHT COMPENSATION at MODE (N+1).

In the case where no human faces are being detected, the fifth embodiment also applies the scenery-imaging mode order of BACKLIGHT COMPENSATION, SPOT METERING•CENTER, SPOT METERING•LEFT and SPOT METERING•RIGHT, at MODE 1, MODE 2, MODE 3, and MODE 4, respectively, in the same way as the third embodiment.

The fifth embodiment will further be described with reference to a flowchart shown in FIG. 20 for the case where the N (N being a positive integer of 2 or more) number of human faces are detected.

The description starts from Step 405 and then from Step 414 because Steps S401 to S404 are identical to Steps S201 to S204 and Steps S406 to S413 to Steps S205 to S212 shown in FIG. 15.

When the human face detector 5 is detecting the N number of human faces (YES in Step 403), the controller 6 assigns the numbers (1) to (N) to faces 1 to N, respectively, from the right side of the display screen 10, in Step S405. Then, the controller 6 switches the order of imaging modes to the face-detected mode order, in Step S406, which is followed by Step S407 and the succeeding steps.

When the controller 6 determines in Step S410 that the current order of imaging modes to be switched is the face-detected mode order for the case where the N number of human faces are being detected, the controller 6 further determines in Step S414 which mode is active at present.

When any of the modes MODE 1 to MODE N is active at present in Step S2414, the controller 6 switches the imaging mode to the next mode, or MODE 1 to MODE 2, MODE 2 to MODE 3, . . . , or MODE N to MODE (N+1), in Step S415. On the contrary, when MODE (N+1) is active at present in Step S414, the controller 6 puts the imaging mode to MODE OFF in Step S416.

As described with respect to FIG. 20, the present invention achieves optimization of the imaging mode order for BACKLIGHT COMPENSATION and SPOT METERING for the cases where no human faces are being detected and a plurality of human faces are being detected.

In the embodiments described above, the imaging-mode menu window or imaging-mode order is switched right away when any imaging-mode menu window is not displayed or any imaging mode is not active. However, the menu window or mode order may be kept for a specific duration even if any menu window is not displayed or any imaging mode is not active.

It is further understood by those skilled in the art that the foregoing descriptions are preferred embodiments of the disclosed apparatus and that various changes and modifications may be made in the invention without departing from the sprit and scope of thereof.

For example, imaging modes need not be limited to SPOT METERING and/or BACKLIGHT COMPENSATION described in the embodiments.

As disclosed above, in detail, the present invention provides an imaging apparatus that allows a user to easily select the best imaging mode in accordance with imaging conditions, without specific and complex signal processing circuitry.

What is claimed is:

1. An imaging apparatus comprising:
    an imaging device to convert light from a target object into an electric signal carrying an image of the object;
    a video signal processor to generate a video signal based on the electric signal;
    a human face detector to detect at least a human face of at least one human if the human is contained in the image, based on the video signal;
    an on-screen display generator to automatically generate an on-screen signal for either a first imaging-mode menu window or a second imaging-mode menu window each for use in selection of an imaging mode among a plurality of imaging modes, the first imaging-mode menu window being used when no human face is being detected by the human face detector, the second imaging-mode menu window being used when the human face is being detected by the human face detector;
    a display screen to receive the on-screen signal to display the first or the second imaging-mode menu window; and
    a controller to control the on-screen display generator, based on face detection information supplied by the human face detector, the information indicating at least whether the human face is contained in the image, so that the on-screen display generator generates the on-screen signal for the first or the second imaging-mode menu window.

2. The imaging apparatus according to claim 1, wherein the first and second imaging-mode menu windows include different imaging mode orders.

3. The imaging apparatus according to claim 1, wherein the first and second imaging-mode menu windows include different numbers of imaging modes.

4. The imaging apparatus according to claim 1, wherein at least either the first or the second imaging-mode menu window includes a sub-function imaging mode for at least one of the imaging modes.

5. The imaging apparatus according to claim 4, wherein the sub-function imaging mode included in the first imaging-mode menu window is not included in the second imaging-mode menu window.

6. The imaging apparatus according to claim 4, wherein the sub-function imaging mode included in the second imaging-mode menu window is not included in the first imaging-mode menu window.

7. The imaging apparatus according to claim 1, wherein the human face detector detects a sex of the human, wherein the on-screen display generator supplies the on-screen signal to the display screen under control by the controller based on the face detection information indicating the sex of the human so that the display screen displays the second imaging-mode menu window in accordance with the sex of the human.

8. The imaging apparatus according to claim 7, wherein the second imaging-mode menu window includes an imaging mode order in accordance with the sex of the human.

9. The imaging apparatus according to claim 7, wherein the second imaging-mode menu window includes a particular number of imaging modes in accordance with the sex of the human.

10. The imaging apparatus according to claim 1, wherein the human face detector detects an age of the human, wherein the on-screen display generator supplies the on-screen signal to the display screen under control by the controller based on the face detection information indicating the age of the human so that the display screen displays the second imaging-mode menu window in accordance with the age of the human.

11. The imaging apparatus according to claim 10, wherein the human face detector determines whether the human is a child or not based on the age, wherein the on-screen display generator supplies the on-screen signal to the display screen under control by the controller based on the face detection information indicating that the human is the child or not so that the display screen displays the second imaging-mode menu window in accordance with whether the human is the child or not.

12. The imaging apparatus according to claim 11, wherein the second imaging-mode menu window includes an imaging mode order in accordance with whether the human is the child or not.

13. The imaging apparatus according to claim 11, wherein the second imaging-mode menu window includes a particular number of imaging modes in accordance with whether the human is the child or not.

14. An imaging apparatus comprising:
    an imaging device to convert light from a target object into an electric signal carrying an image of the object;
    a video signal processor to generate a video signal based on the electric signal;
    a human face detector to detect a human face of at least one human if the human is contained in the image, based on the video signal;
    an imaging-condition setter to set an imaging condition suitable for each of a plurality of imaging modes to activate each imaging mode;
    an operation unit through which the imaging modes are switched from one to another; and
    a controller to automatically control an order of the imaging modes so that the order of the imaging modes is changed between a first case where no human face is being detected by the human face detector and a second case where the human face is being detected by the human face detector, when the imaging modes are to be switched through the operation unit.

15. An imaging apparatus according to claim 14 further comprising:
    an on-screen display generator to generate an on-screen signal for a mode-identification image indicating an imaging mode activated by the imaging-condition setter; and
    a display screen to receive the on-screen signal to display the mode-identification image,
    wherein the controller controls an order of mode-identification images corresponding to the imaging modes so that the order of the mode-identification images is changed between the first and second cases, when the imaging modes are to be switched through the operation unit.

16. The imaging apparatus according to claim 14, wherein the imaging modes include at least a first mode to be performed based on a predetermined first region in the display screen and a second mode to be performed based on a predetermined second region in the display screen, wherein the controller controls the first and second modes so that the first mode becomes active before the second mode if the first region is closer than the second region to the human face, when the human face detector is detecting the human face.

17. The imaging apparatus according to claim 14, wherein the controller changes the number of the imaging modes between the first and second cases.

18. The imaging apparatus according to claim 14, wherein the imaging modes include at least either spot metering based on brightness of a predetermined region in the display screen or spot metering based on brightness of a region of the human face that is being detected by the human face detector.

19. The imaging apparatus according to claim 14, wherein the imaging modes include a plurality of first modes to be performed based on a plurality of first regions in the display screen and a plurality of second modes to be performed based on brightness of a plurality of second regions of a plurality of human faces in the display screen if the human faces are being detected by the human face detector, wherein the controller controls the first and second modes so that a specific first mode becomes inactive when one of the first regions correspond to the specific first mode is closest to any of the second regions.

20. The imaging apparatus according to claim 19, wherein each first mode is spot metering based on brightness of a predetermined region in the display screen and each second mode is spot metering based on brightness of a region of each human face that is being detected by the human face detector.

21. The imaging apparatus according to claim 14, wherein the imaging modes include a mode of backlight compensation.

22. An imaging apparatus comprising:
an imaging device to convert light from a target object into an electric signal carrying an image of the object;
a video signal processor to generate a video signal based on the electric signal;
a human face detector to detect a human face of at least one human if the human is contained in the image, based on the video signal; an imaging-condition setter to set an imaging condition suitable for each of a plurality of imaging modes; and
a controller to automatically change the number of the imaging modes between a first case where no human face is being detected by the human face detector and a second case where the human face is being detected by the human face detector.

23. The imaging apparatus according to claim 22, wherein the imaging modes include at least either spot metering based on brightness of a predetermined region in the display screen or spot metering based on brightness of a region of the human face that is being detected by the human face detector.

24. The imaging apparatus according to claim 22, wherein the imaging modes include a mode of backlight compensation.

* * * * *